US010332259B2

(12) United States Patent
Nishiyama et al.

(10) Patent No.: US 10,332,259 B2
(45) Date of Patent: Jun. 25, 2019

(54) IMAGE PROCESSING APPARATUS, IMAGE PROCESSING METHOD, AND PROGRAM

(71) Applicant: CANON KABUSHIKI KAISHA, Tokyo (JP)

(72) Inventors: Tomohiro Nishiyama, Tama (JP); Koichi Fukuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 147 days.

(21) Appl. No.: 15/517,498

(22) PCT Filed: Sep. 30, 2015

(86) PCT No.: PCT/JP2015/004975
§ 371 (c)(1),
(2) Date: Apr. 6, 2017

(87) PCT Pub. No.: WO2016/056202
PCT Pub. Date: Apr. 14, 2016

(65) Prior Publication Data
US 2017/0309028 A1    Oct. 26, 2017

(30) Foreign Application Priority Data
Oct. 9, 2014    (JP) .................................. 2014-208405

(51) Int. Cl.
*G06T 7/11* (2017.01)
*G01C 3/14* (2006.01)
*G06T 7/00* (2017.01)

(52) U.S. Cl.
CPC .................. *G06T 7/11* (2017.01); *G01C 3/14* (2013.01); *G06T 7/97* (2017.01); *G06T 2207/10052* (2013.01); *G06T 2207/20021* (2013.01)

(58) Field of Classification Search
CPC ... G06T 7/11; G06T 7/97; G06T 2207/20021; G06T 2207/10052; G01C 3/14
See application file for complete search history.

(56) References Cited

U.S. PATENT DOCUMENTS

| 2013/0294681 A1 | 11/2013 | Nishimura |
| 2014/0002605 A1* | 1/2014 | Liao ........................ G06T 5/005 |
| | | 348/46 |

(Continued)

FOREIGN PATENT DOCUMENTS

| JP | 2001-319229 A | 11/2001 |
| JP | 4517449 B2 | 8/2010 |

(Continued)

*Primary Examiner* — Yon J Couso
(74) *Attorney, Agent, or Firm* — Canon U.S.A., Inc. IP Division

(57) ABSTRACT

An image processing apparatus inputs image data representing a plurality of images from mutually different viewpoints, estimates first information indicating a disparity between the plurality of images by comparing image regions each having a first size between the plurality of images, and identifies image regions each having a second size different from the first size, between the plurality of images, based on the first information estimated. The estimation estimates second information indicating the magnitude of a disparity between the plurality of images in the identified image regions by comparing the image regions each having the second size between the plurality of images.

17 Claims, 13 Drawing Sheets

(56) References Cited

U.S. PATENT DOCUMENTS

| | | | |
|---|---|---|---|
| 2014/0049612 A1* | 2/2014 | Ishii | G01B 11/00 348/46 |
| 2014/0125660 A1 | 5/2014 | Redmann | |
| 2015/0221098 A1* | 8/2015 | Uemori | G06T 7/254 382/154 |
| 2015/0248594 A1* | 9/2015 | Zhong | B60R 11/04 382/195 |
| 2016/0269615 A1* | 9/2016 | Deng | G06T 7/80 |

FOREIGN PATENT DOCUMENTS

| | | |
|---|---|---|
| JP | 2011-237933 | 11/2011 |
| JP | 5323222 B2 | 10/2013 |
| JP | 2013242854 A | 12/2013 |
| JP | 2014523660 A | 9/2014 |

* cited by examiner

[Fig. 1]
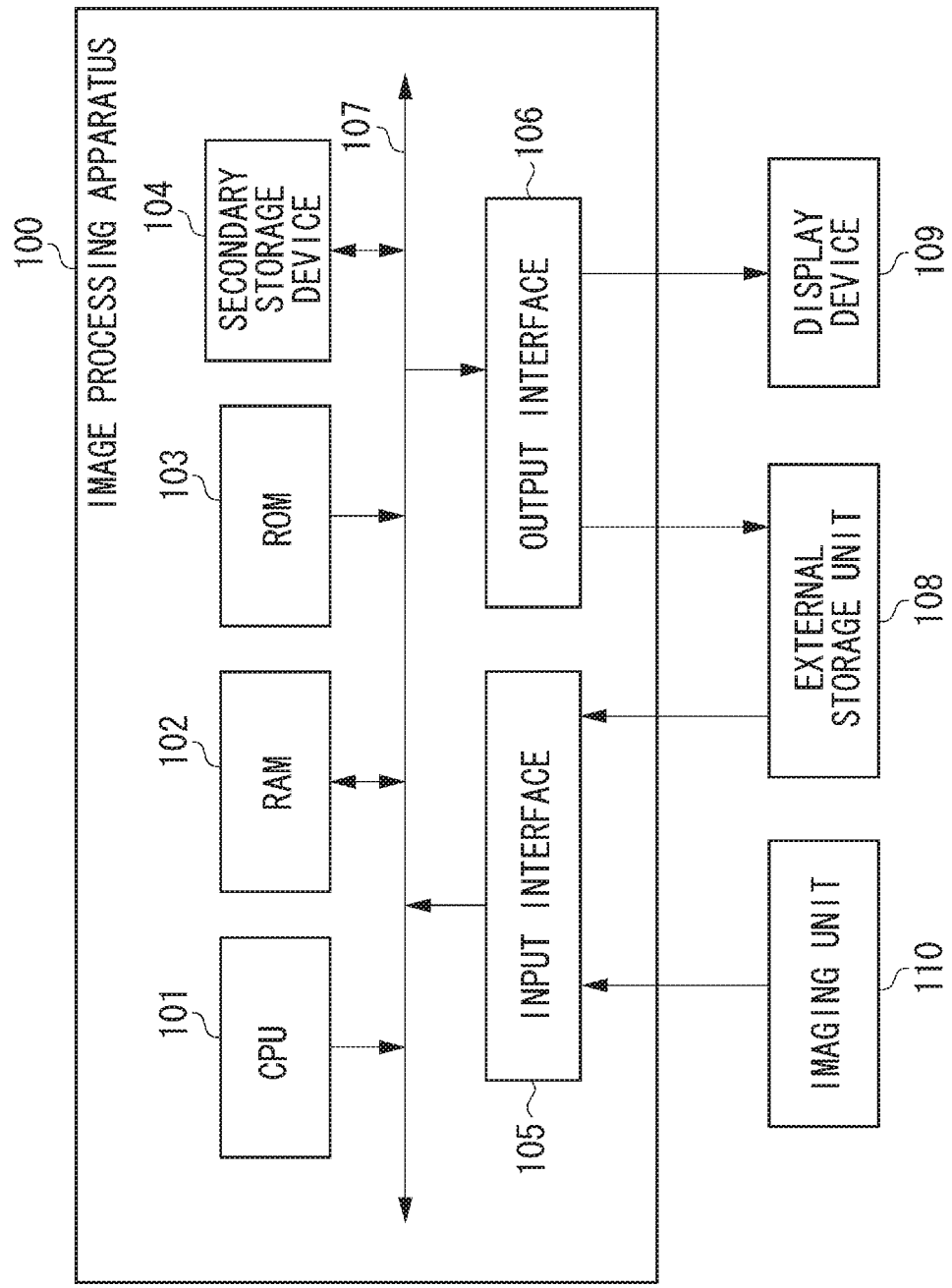

[Fig. 2A]
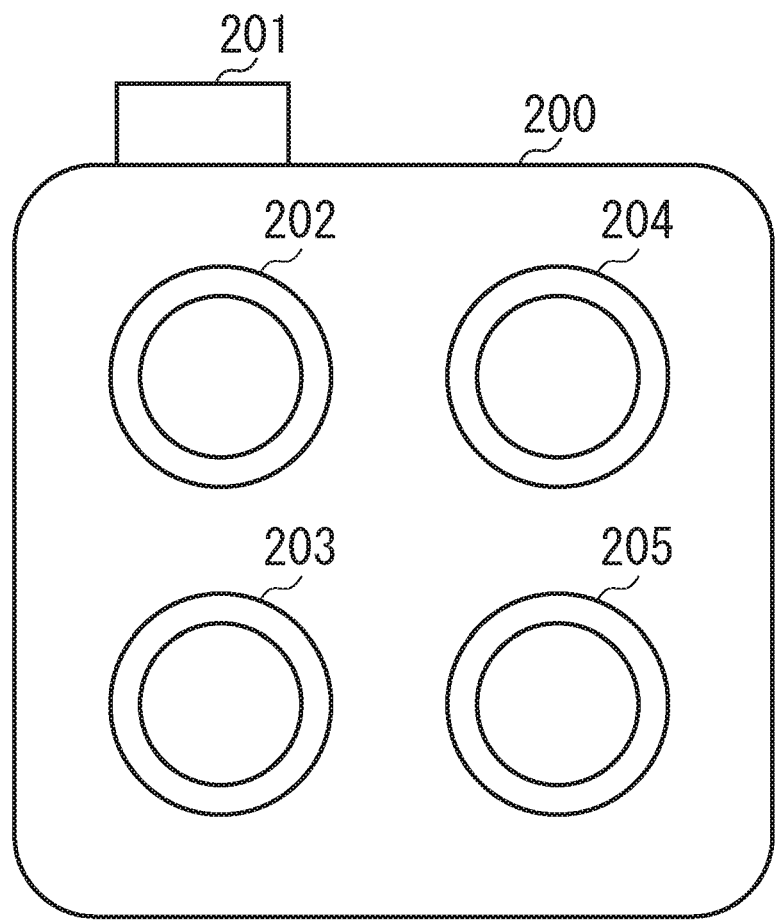

[Fig. 2B]
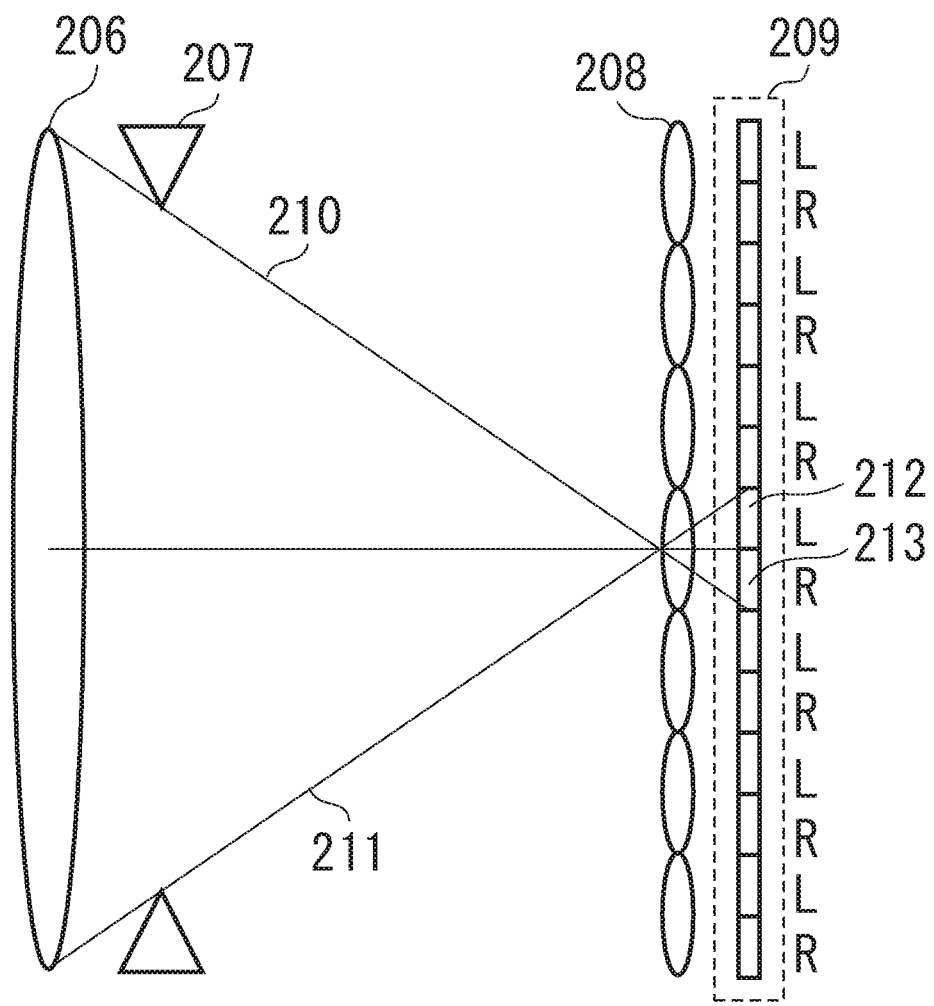

[Fig. 3]
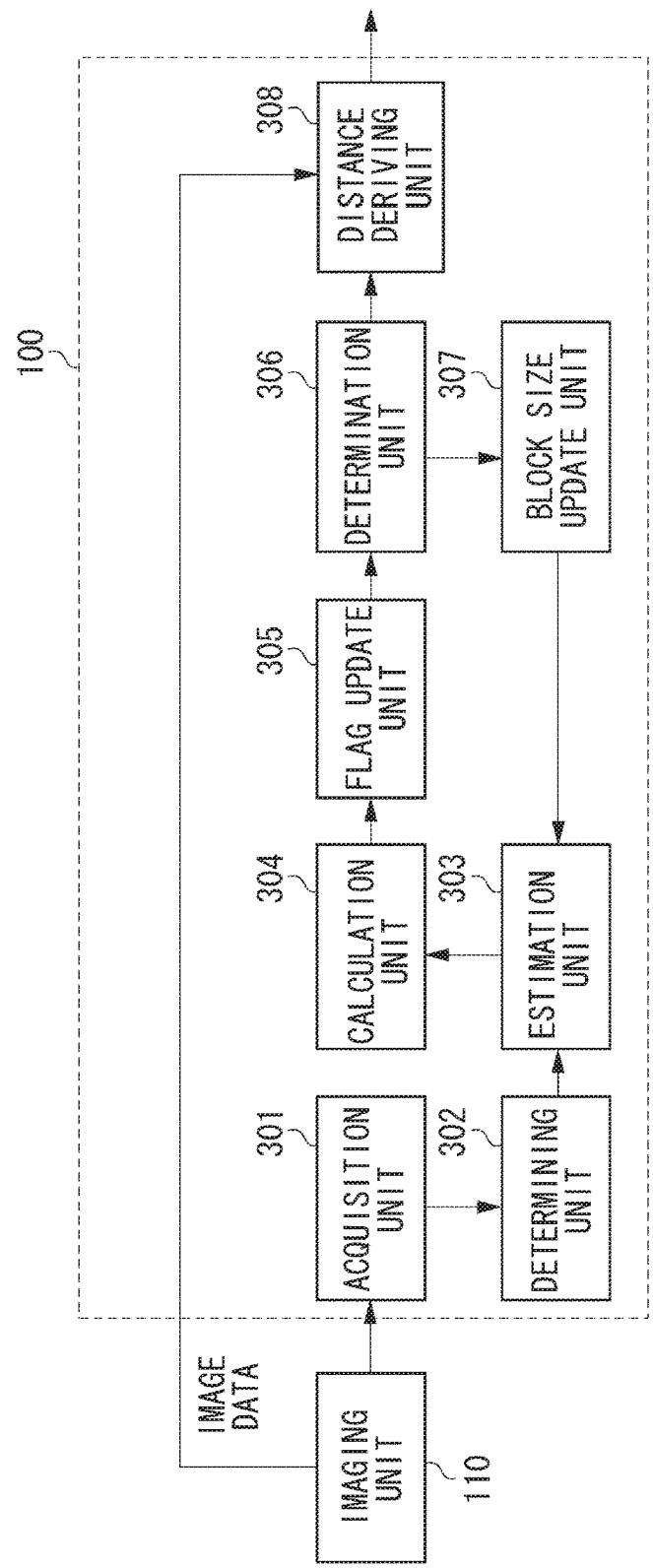

[Fig. 4]
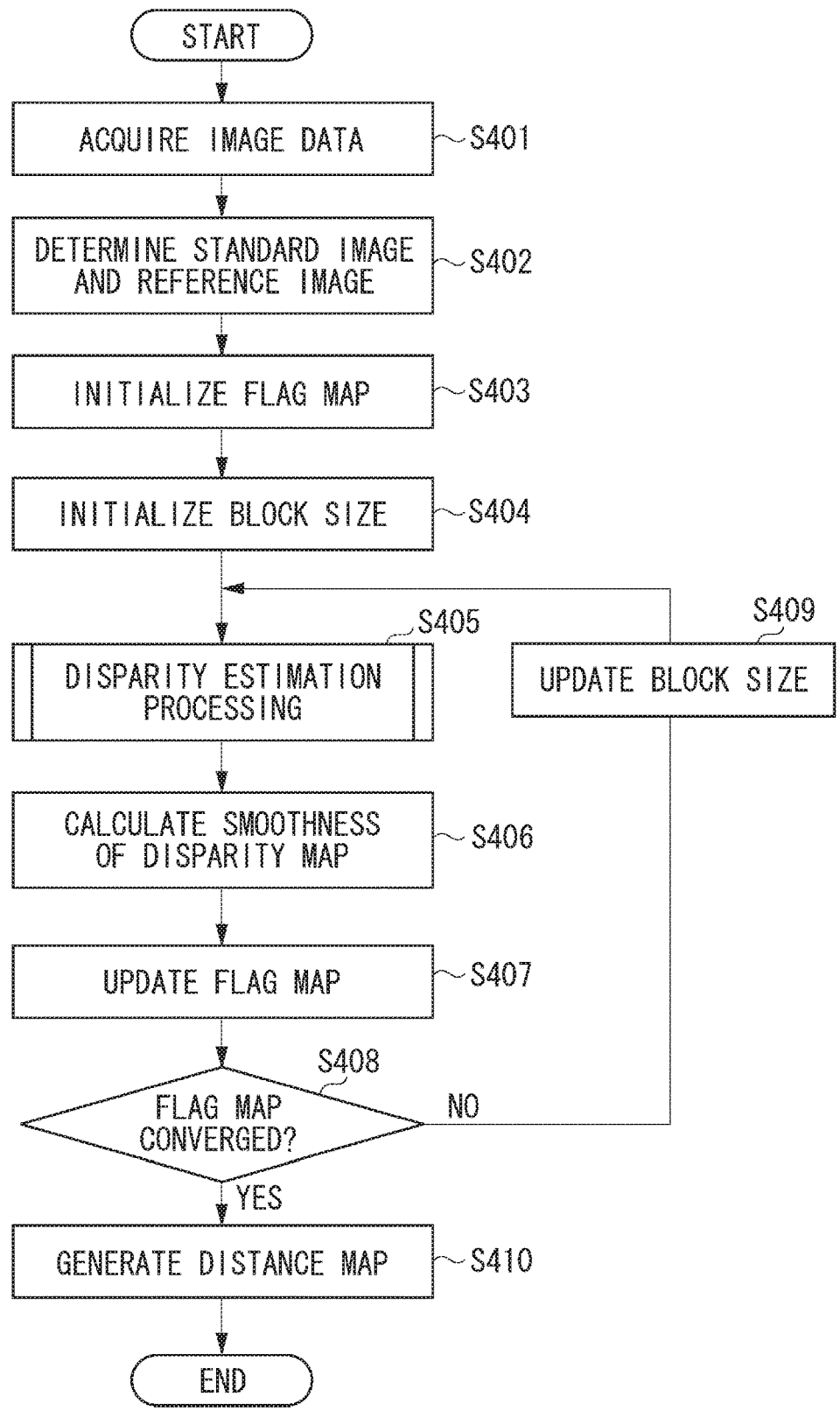

[Fig. 5A]
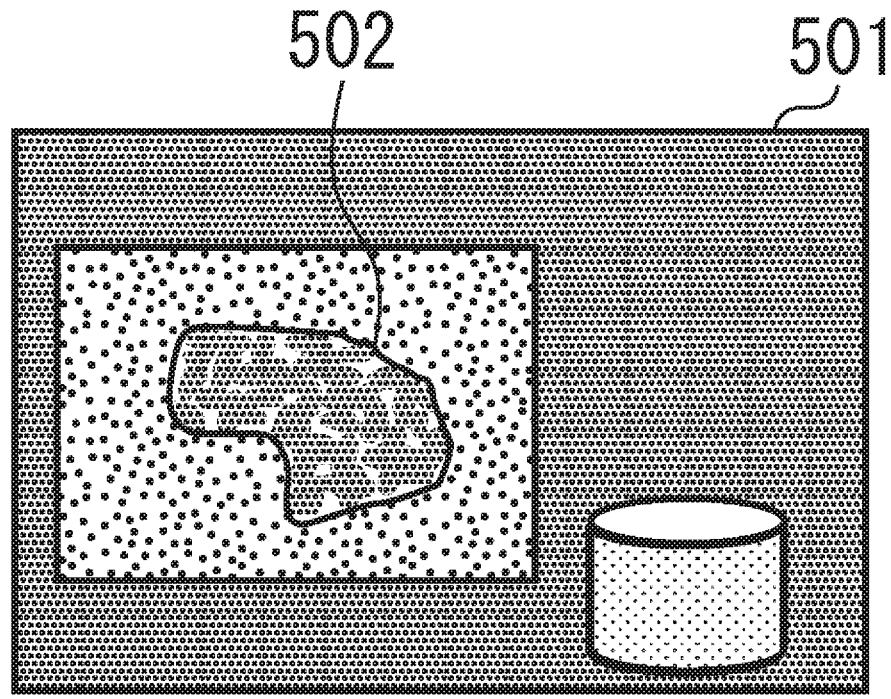
[Fig. 5B]
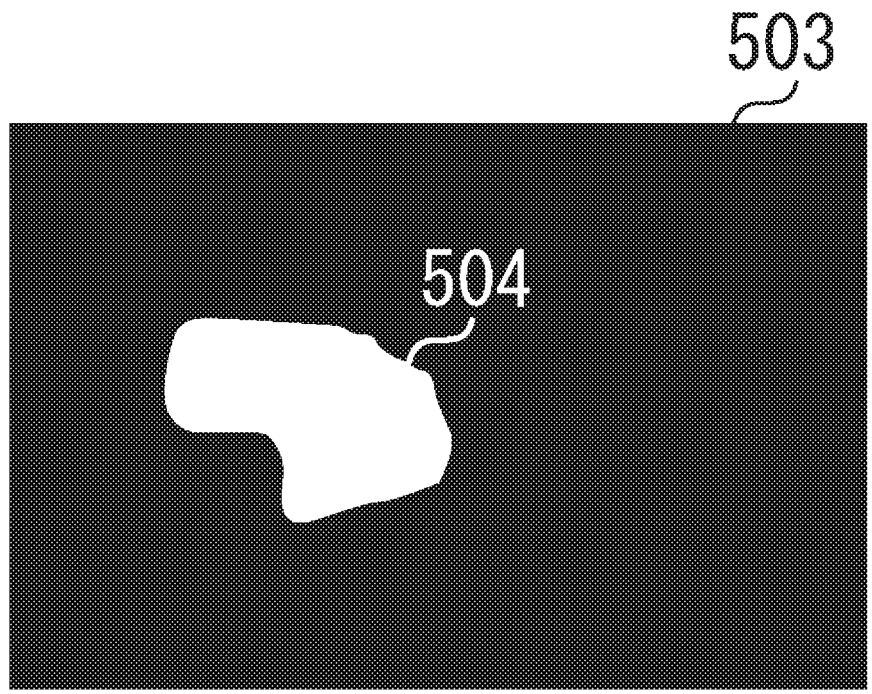

[Fig. 5C]
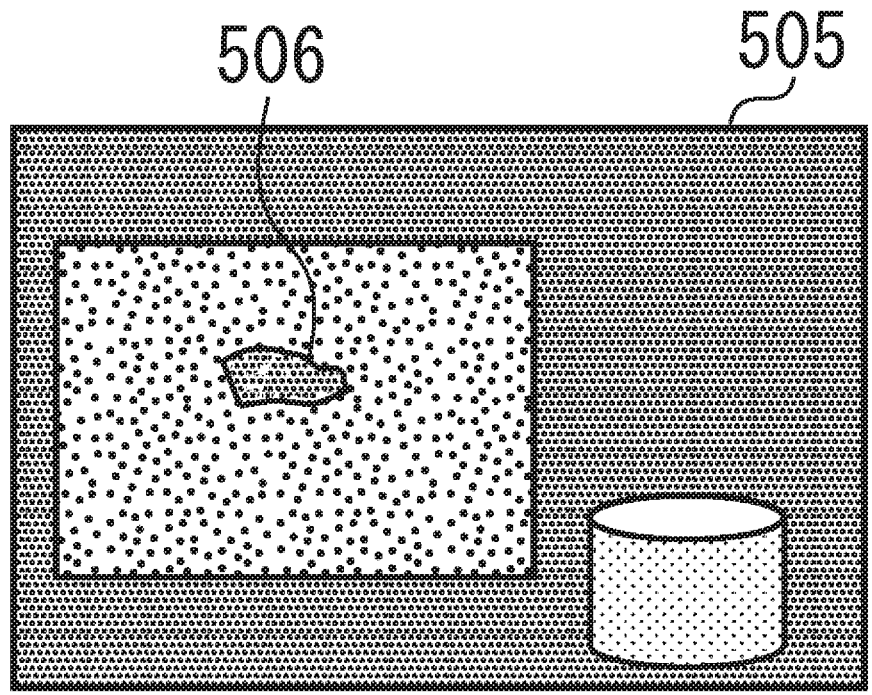
[Fig. 5D]
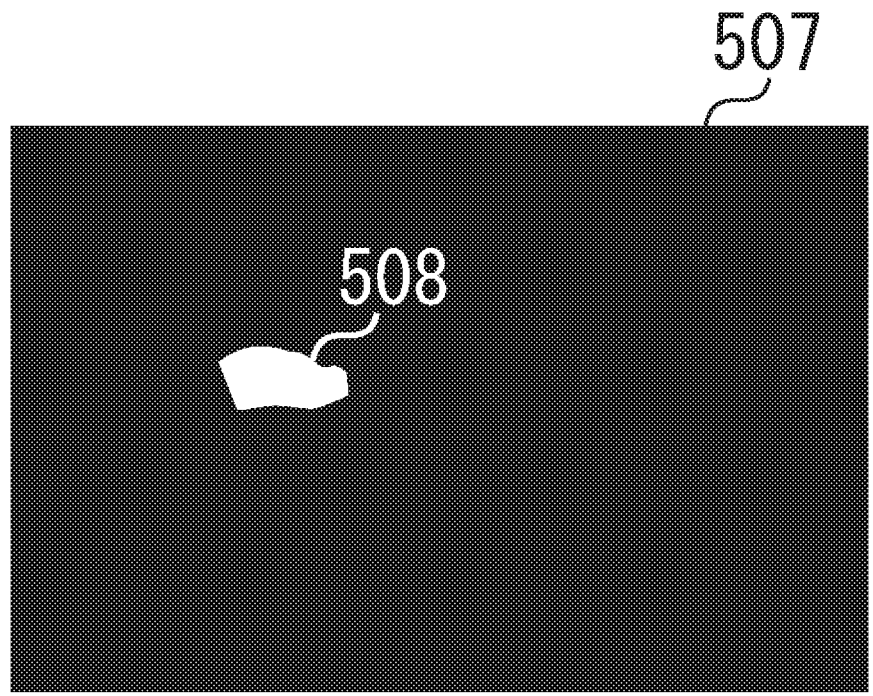

[Fig. 6]
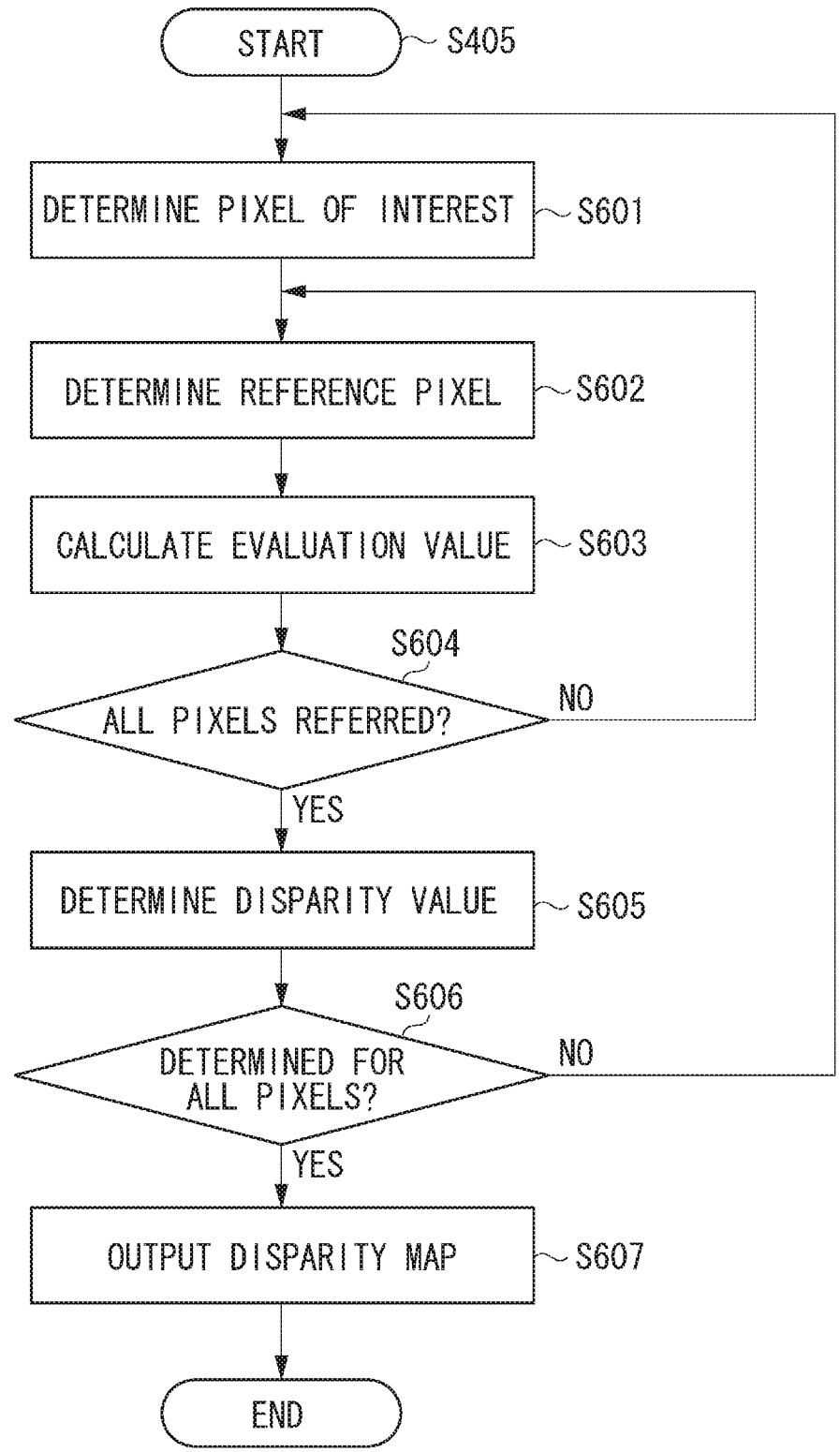

[Fig. 7]
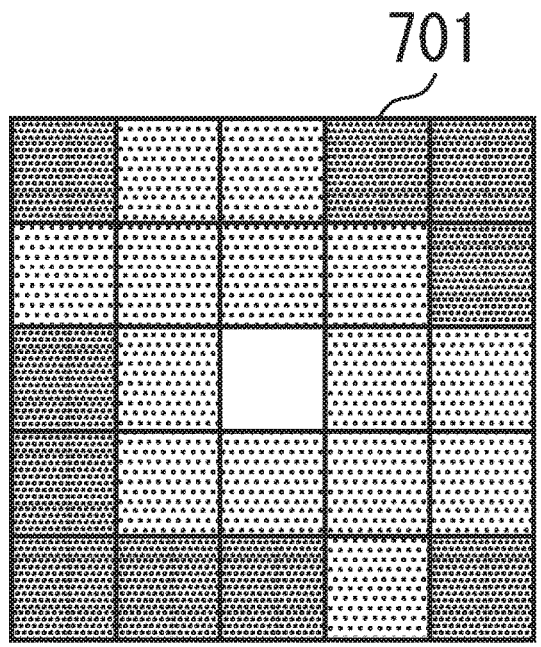
[Fig. 8]
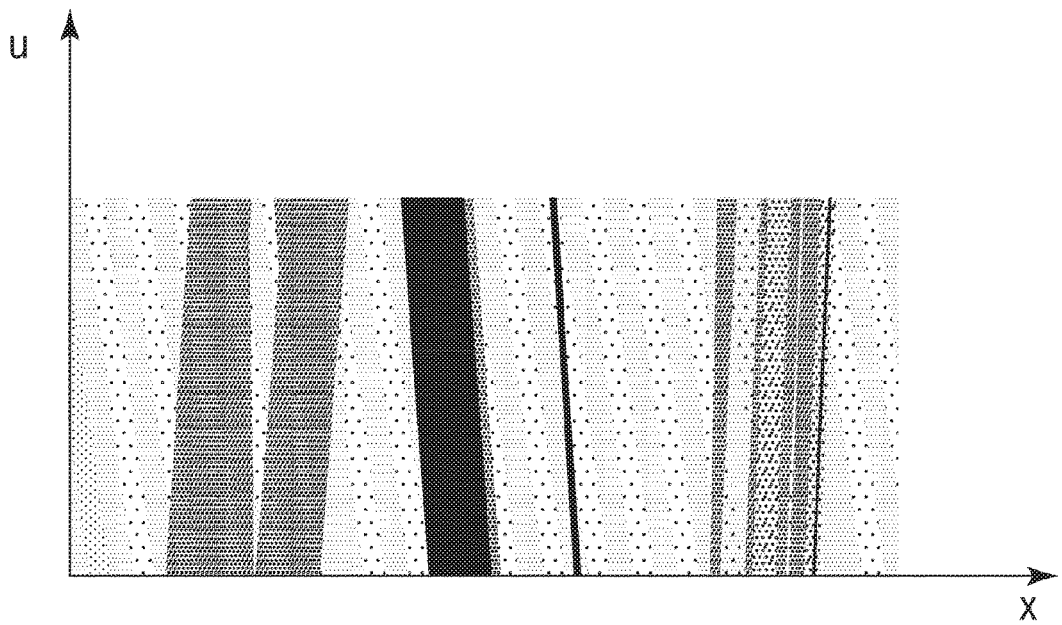

[Fig. 9]
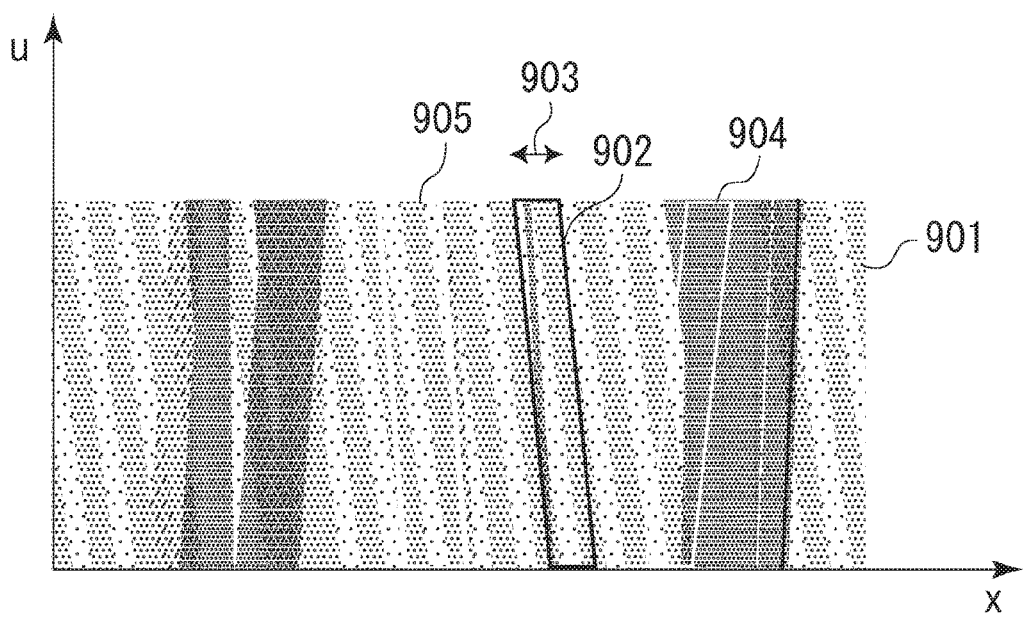

[Fig. 10]
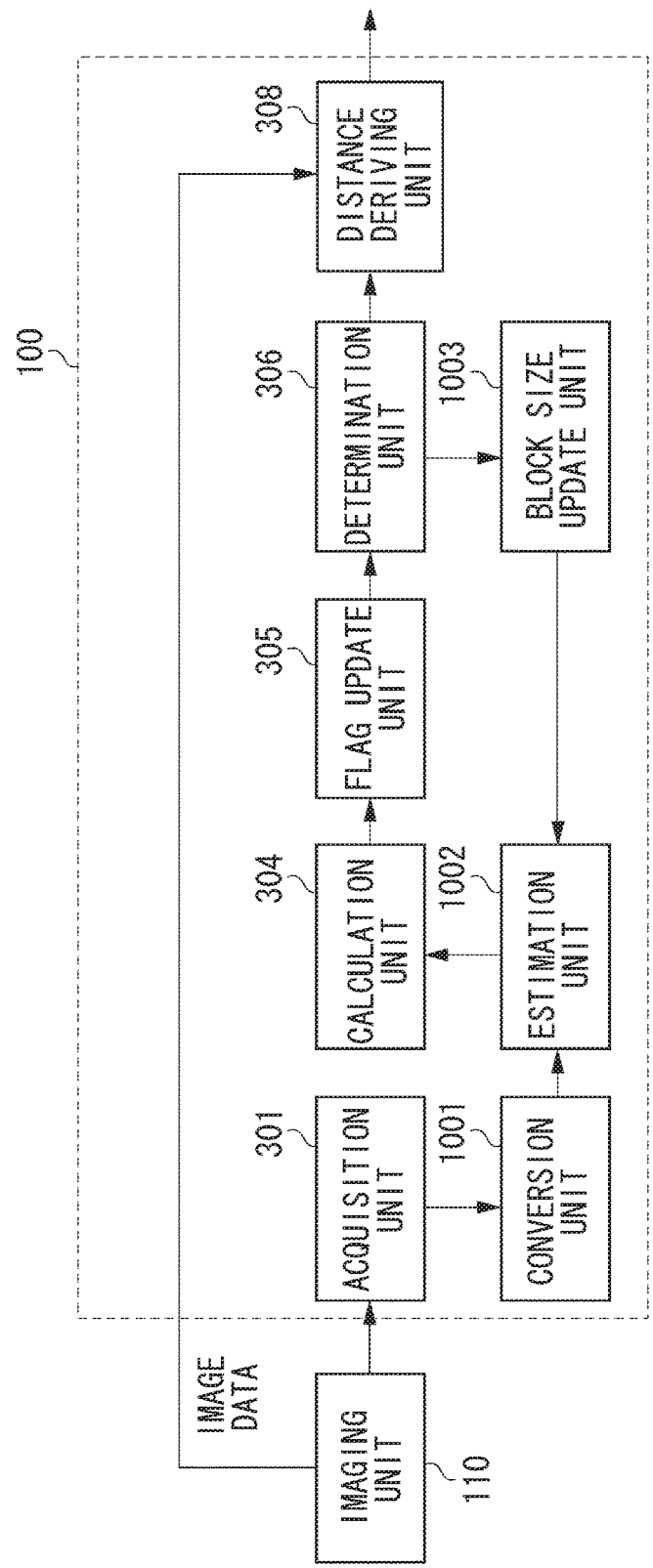

[Fig. 11]
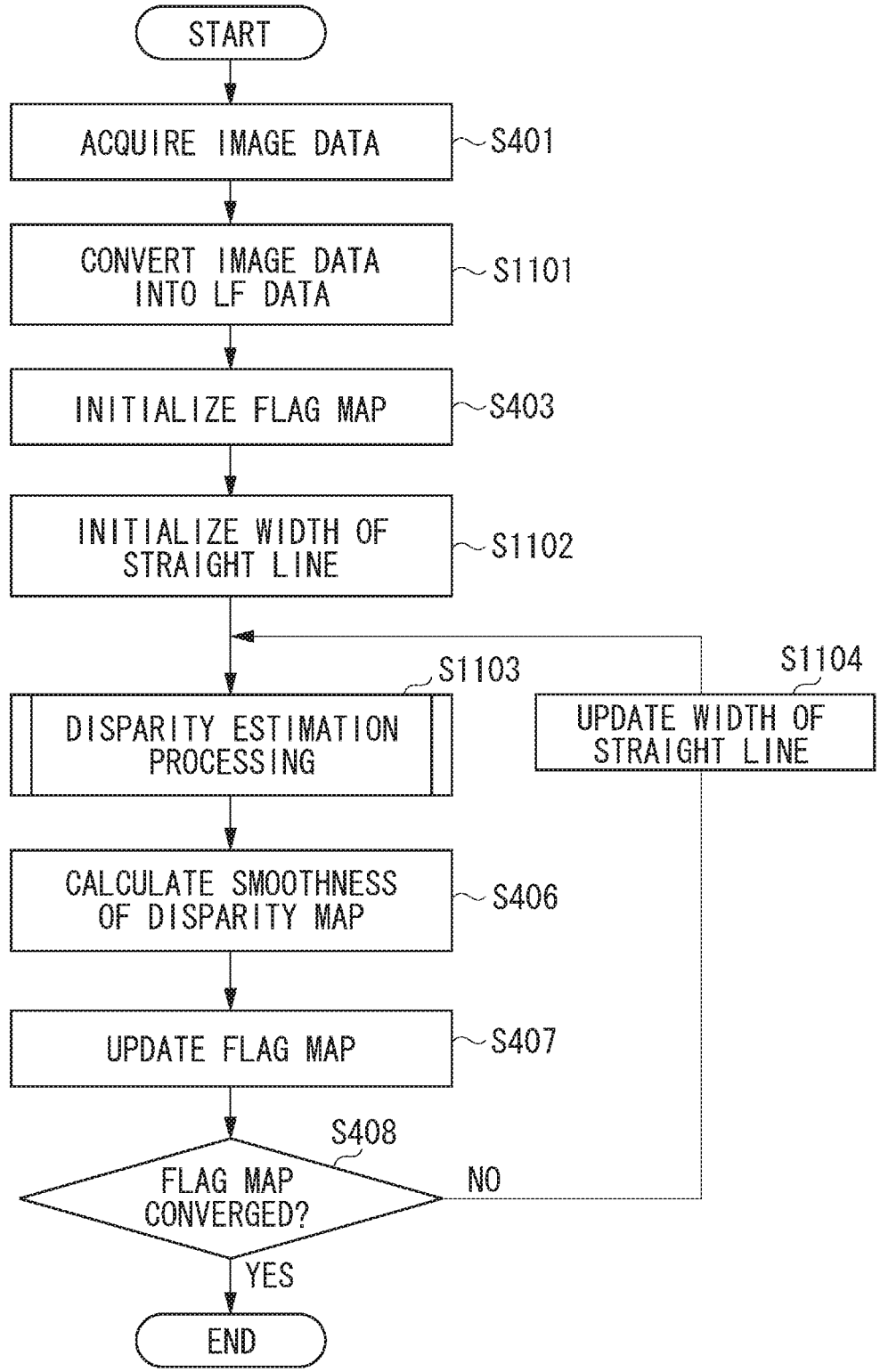

[Fig. 12]
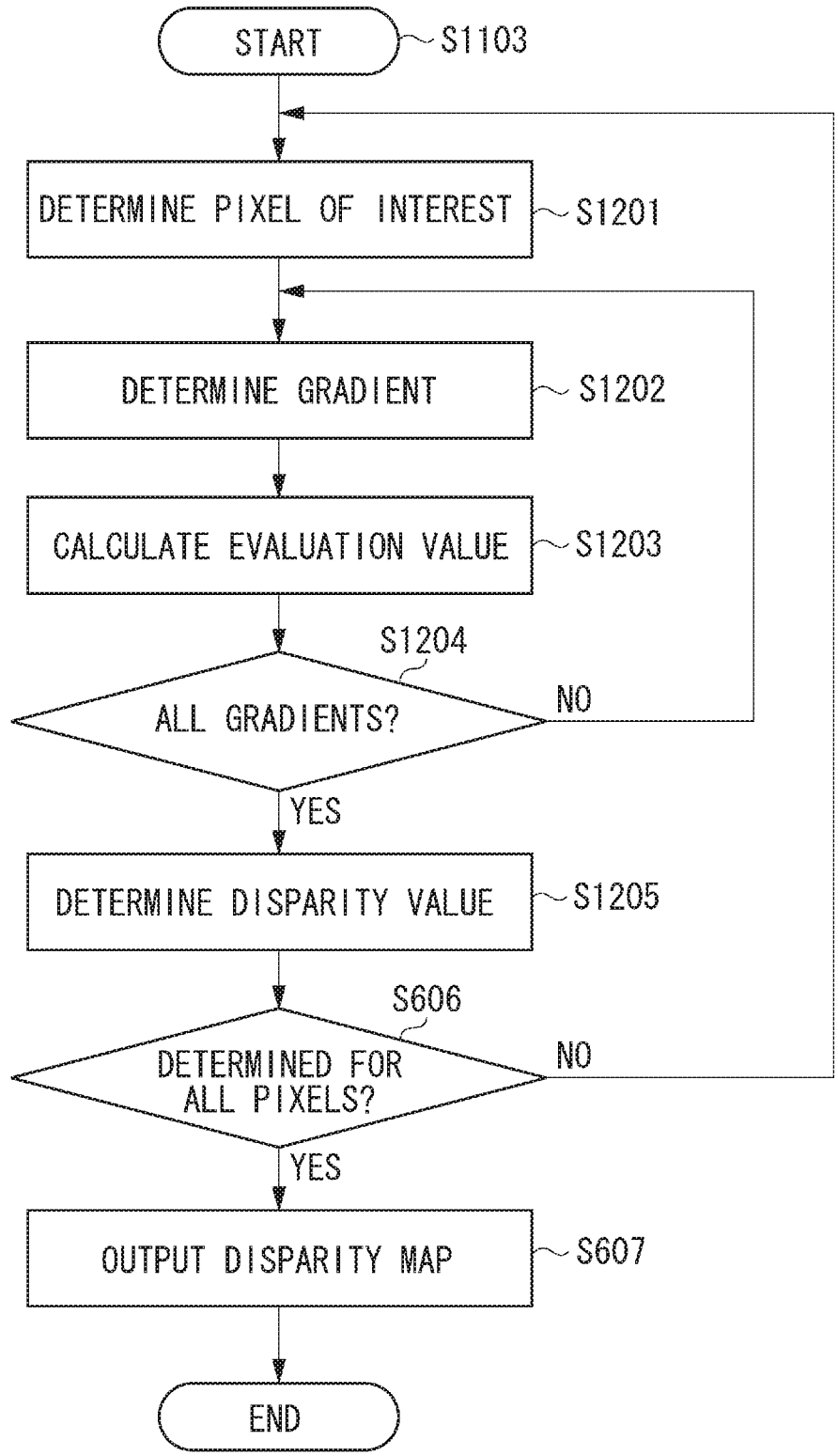

IMAGE PROCESSING APPARATUS, IMAGE PROCESSING METHOD, AND PROGRAM

CROSS-REFERENCE TO RELATED APPLICATIONS

The present application is a National Phase application of International Patent Application No. PCT/JP2015/004975, filed Sep. 30, 2015, entitled "IMAGE PROCESSING APPARATUS, IMAGE PROCESSING METHOD, AND PROGRAM", which claims priority to Japanese Application No. 2014-208405, filed Oct. 9, 2014, both of which are hereby expressly incorporated by reference herein in their entirety.

TECHNICAL FIELD

The present invention relates to image processing that is performed on data representing a plurality of images that is be obtained by photographing an object from a plurality of viewpoints that are mutually different.

BACKGROUND ART

There is a conventional technique including estimating a distance from an object based on a plurality of images that can be obtained by photographing the same object from a plurality of viewpoints that are mutually different and using the estimated distance information in image processing. It is conventionally known to use a disparity between images as a method for estimating distance information based on a plurality of images corresponding to different viewpoints. The disparity is a value representing a deviation of the position of an image region corresponding to the same object region between images corresponding to respective viewpoints. The magnitude of a disparity is dependent on the distance from an object. Therefore, it is feasible to estimate the distance from the object based on the magnitude of the disparity having occurred between respective images and the distance between respective viewpoints. The disparity is obtained by detecting image regions corresponding to the same object region between images captured at respective viewpoints, for example, by using an appropriate method (e.g., block matching method).

As discussed in Japanese Patent No. 4517449, there is a conventionally known technique capable of reducing the processing load in block matching by using a plurality of images generated by applying a filter to a disparity estimation target image and are mutually different in resolution. According to the technique discussed in Japanese Patent No. 4517449, speedily obtaining high-resolution disparity information is feasible by performing block matching in a limited search range block of an image having a higher resolution based on a result of the block matching applied to a low-resolution image. Further, as discussed in Japanese Patent No. 5323222, it is a conventionally known technique for inserting a provisional disparity value or using a value interpolated by a peripheral disparity value as a disparity value of a texture-less region, i.e., a region in which the matching accuracy tends to deteriorate in the block matching and the variation of pixel value in the block is small.

According to the technique discussed in Japanese Patent No. 4517449, if the block matching performed on a low-resolution image, there will be a higher possibility that a plurality of objects mutually differentiated in distance is included in one block, compared to a case where an image having a higher resolution is used. When a far and near adjacent region (i.e., a region including a plurality of objects mutually differentiated in distance) is included in one block, the disparity is not constant in the block. Therefore, the accuracy of the block matching will deteriorate. Accordingly, even in the block matching performed on an image having a higher resolution based on a result of the block matching performed on a low-resolution image, there is a problem that the accuracy of the block matching deteriorates in the far and near adjacent region. Further, according to a technique discussed in Japanese Patent No. 5323222, there is a problem that a disparity value inserted or interpolated in the texture-less region may not reflect an actual disparity value.

CITATION LIST

Patent Literature

PTL 1: Japanese Patent No. 4517449
PTL 2: Japanese Patent No. 5323222

SUMMARY OF INVENTION

Solution to Problem

The present invention intends to improve the accuracy in disparity estimation between a plurality of images obtained by photographing the same object from a plurality of viewpoints that are mutually different. To solve the above-described problem, an image processing apparatus according to the present invention includes an input unit configured to input image data representing a plurality of images obtained by photographing the same object from a plurality of viewpoints that are mutually different, an estimation unit configured to estimate first information indicating the magnitude of a disparity between the plurality of images by comparing image regions each having a first size between the plurality of images, and an identifying unit configured to identify image regions of the plurality of images Whose disparity is estimated by comparing image regions each having a second size, which is different from the first size, between the plurality of images, based on the first information estimated by the estimation unit. The estimation unit further estimates second information indicating the magnitude of a disparity between the plurality of images in the image regions identified by the identifying unit by comparing the image regions each having the second size between the plurality of images.

Further features of the present invention will become apparent from the following description of exemplary embodiments with reference to the attached drawings.

BRIEF DESCRIPTION OF DRAWINGS

FIG. 1 is a block diagram illustrating a configuration of an image processing apparatus.

FIG. 2A illustrates an example of an imaging unit.

FIG. 2B illustrates an example of an imaging unit.

FIG. 3 is a block diagram illustrating a configuration of the image processing apparatus according to a first exemplary embodiment.

FIG. 4 is a flowchart illustrating a procedure of distance deriving processing according to the first exemplary embodiment.

FIG. 5A illustrates hierarchy classified processing according to the first exemplary embodiment.

FIG. 5B illustrates hierarchy classified processing according to the first exemplary embodiment.

FIG. 5C illustrates hierarchy classified processing according to the first exemplary embodiment.

FIG. 5D illustrates hierarchy classified processing according to the first exemplary embodiment.

FIG. 6 is a flowchart illustrating a procedure of disparity estimation processing according to the first exemplary embodiment.

FIG. 7 illustrates a matching region according to a second exemplary embodiment.

FIG. 8 illustrates an example of light field data.

FIG. 9 illustrates the concept of disparity estimation processing according to a third exemplary embodiment.

FIG. 10 is a block diagram illustrating a configuration an image processing apparatus according to the third exemplary embodiment.

FIG. 11 is a flowchart illustrating a procedure of distance deriving processing according to the third exemplary embodiment.

FIG. 12 is a flowchart illustrating a procedure of disparity estimation processing according to the third exemplary embodiment.

DESCRIPTION OF EMBODIMENTS

First Exemplary Embodiment

The present exemplary embodiment characterized by performing block matching repetitively while changing a block matching condition based on disparity reliability estimated through block matching to improve the accuracy of the block matching, as described in detail below.

First, the principle of processing that is performed according to the present exemplary embodiment will be described in detail below. A block matching method includes comparing image regions each having the same size between two images while changing target image regions to be compared and detecting image regions where an evaluation value representing the degree of matching can be maximized (or minimized) as corresponding image regions. Further, the block matching method includes deriving a positional difference between the detected corresponding image regions in the images as a disparity corresponding to these image regions.

The accuracy of the block matching is greatly dependent on the magnitude (i.e., size) of blocks to be used in the matching processing. An appropriate block size is variable dependent on image features. For example, when the block size is large, there will be a higher possibility that a far and near adjacent region is included in the block. The far and near adjacent region includes portions mutually different in deviation amount of an object image in the block. Therefore, it is difficult to determine substantially the same image regions of the compared images that are different in viewpoint. In other words, the accuracy of the block matching will deteriorate. On the other hand, when the block size being set in the block matching is small, numerous image regions that are not so different in evaluation value will be detected in a texture-less region. In other words, there will be a higher possibility of detecting a wrong image region as a corresponding image region.

In view of the foregoing, the present exemplary embodiment employs hierarchy-type block matching processing characterized by selectively using a plurality of blocks that are different in size. For example, the hierarchy-type block matching processing includes initially setting a smallest size block for hierarchy 1 and gradually increasing the block size when the order of the hierarchy increases stepwise. Further, the hierarchy-type block matching processing is characterized by using a disparity estimation result obtained in other hierarchy as a provisional disparity value for a hierarchy at which the disparity estimation has failed.

The processing according to the present exemplary embodiment includes determining a region in which the disparity estimation has failed, i.e., a region in which the block matching has failed, based on the smoothness of the disparity map (i.e., image data storing disparity values corresponding to respective pixel positions as pixel values). In general, the magnitude of the disparity gradually changes in a region other than the far and near adjacent region. Therefore, it is feasible to estimate a region whose smoothness is low in the disparity map as a region in which the disparity estimation has failed. Therefore, disparity estimation processing according to the present exemplary embodiment includes identifying a low-smoothness pixel surrounded by a peripheral region that is lower in the smoothness of the disparity map as a pixel belonging to a region in which the disparity estimation has been correctly performed and excluding the low-smoothness pixel from targets to be subjected to the processing. Further, the disparity estimation processing according to the present exemplary embodiment includes identifying a high-smoothness pixel surrounded by a peripheral region that is high in the smoothness of the disparity map as a pixel belonging to a region in which the disparity estimation has not been correctly performed and performing the disparity estimation again in the next hierarchy.

Through the above-described processing, an accurate disparity map can be obtained in both of the texture-less region and the far and near adjacent region. In the present exemplary embodiment, the smoothness of peripheral disparity values is an index used to check whether the obtained disparity value is correct. However, any other index is usable as long as it indicates the degree of reliability of the disparity value of each pixel. For example, in a case where image data does not include any edge structure in a block to be used in the block matching, there will be a higher possibility that a wrong disparity value is calculated. In view of the foregoing, the index indicating the reliability can be the intensity of an edge included in a block to be used in the block matching.

The following is a schematic description of processing according to the present exemplary embodiment. Hereinafter, a detailed system configuration according to the present exemplary embodiment will be described. FIG. 1 illustrates a configuration example of an image processing apparatus 100 according to the present exemplary embodiment. The image processing apparatus 100 includes a central processing unit (CPU) 101, a random access memory (RAM) 102, a read only memory (ROM) 103, a secondary storage device 104, an input interface 105, an output interface 106, and a system bus 107. Further, the image processing apparatus 100 is connected to an external storage unit 108, a display device 109, and an imaging unit 110 via the input interface 105 and the output interface 106.

The CPU 101 is a processor capable of controlling constituent components described below in an integrated manner. The RAM 102 is a memory capable of functionally operating as a main memory or a work area for the CPU 101. The ROM 103 is a memory capable of storing a control program that can be executed by the CPU 101. The CPU 101 can perform various processing by executing the program loaded into the RAM 102 (i.e., the work memory) from the ROM 103 in such a way as to comprehensively control various functional units described below via the system bus 107.

The secondary storage device 104 is a storage device that can store data necessary to execute the program via the system bus 107. The secondary storage device 104 is, for example, a hard disk drive (HUD), an optical disk drive, a flash memory, or any other readable/writable storage device. The input interface 105 is, for example, a serial bus interface (e.g., universal serial bus (USB) or IEEE1394). The image processing apparatus 100 acquires data from the external storage unit 108 (e.g., a hard disk drive, a memory card, a compact flash (CF) card, a secure digital (SD) card, a USB memory, or any other appropriate storage medium) via the input interface 105. Further, the image processing apparatus 100 acquires image data captured by the imaging unit 110 via the input interface 105. The imaging unit 110 is a camera unit configured to capture an image. A configuration example of the imaging unit 110 will be described in detail below.

The output interface 106 is, for example, a serial bus interface similar to the input interface 105 and may be a video output terminal, such as digital video interactive (DVI) or high definition multimedia interface (HDMI) (registered trademark). The image processing apparatus 100 transmits data to the external storage unit 108 via the output interface 106 or causes the display device 109 (e.g., a liquid-crystal display device or any other appropriate output device) to display an image. The image processing apparatus 100 includes other constituent components (not illustrated in FIG. 1), which are not relevant to a substantial part of the present invention. Therefore, redundant description thereof will be avoided.

Next, a configuration example of the imaging unit 110 according to the present exemplary embodiment will be described in detail below with reference to FIGS. 2A and 2B. The imaging unit 110 is configured to obtain image data by photographing the same object from a plurality of viewpoints. As illustrated in FIG. 2A, the imaging unit 110 may be configured to include a plurality of camera units 202 to 205. The image processing apparatus 100 is accommodated in a casing 200. The camera units 202 to 205 are capable of serving as the imaging unit 110 and are disposed in a two-dimensional pattern on a front face of the casing 200. Each camera unit has an optical axis that is perpendicular to the front face of the casing 200 and can acquire color image data. The camera having the above-described configuration is referred to as a multi-eye camera or a camera array. Each of respective camera units 202 to 205 is equipped with a sensor (an image sensor) capable of receiving light information about an imaging target object when a user presses an imaging button 201. The received light signal is then analog-to-digital (A/D) converted. A plurality of pieces of digital data (captured image data) can be simultaneously acquired. The camera units 202 to 205 are disposed at mutually different positions so that image data can be acquired from different viewpoints. In the present exemplary embodiment, the above-described camera including four camera units is a mere example of the multi-eye camera. However, the number of the camera units is not limited to four. Any other configuration including a plurality of camera units provided at different positions to acquire image data differentiated in disparity is employable. However, in enhancing the robustness of disparity estimation, it may not be desirable to align all camera units along the same straight line.

Further, as illustrated in FIG. 2B, the imaging unit 110 may be configured as a plenoptic camera that includes a microlens array 208 disposed between a main lens 206 and an age sensor 209. The microlens array 208 includes a plurality of micro convex lens arranged in a two-dimensional array pattern. The main lens 206 is a conceptional lens that represents a zoom lens and a focus lens. Two beams 210 and 211 two beams entering the main lens 206) sequentially pass through a diaphragm 207 and the microlens array 208 and finally reaches the image sensor 209. In the plenoptic camera, the microlens array 208 has a function of discriminating beams having passed through different regions of the main lens 206. For example, according to the example illustrated in FIG. 2B, a pixel 213 receives the beam 210 having passed through the upper half of the main lens 206 and a pixel 212 receives the beam 211 having passed through the lower half of the main lens 206. As described above, two beams having passed through different regions of the main lens 206 can reach different pixels of the image sensor 209. Therefore, it is feasible to discriminate two or more beams from each other. The relationship between a beam passing through a specific region of the main lens 206 and a pixel of the image sensor 209 where the beam reaches is dependent on image-capturing parameters, such as focal length of the lens and the distance between the lens and the sensor. For example, in FIG. 2B, it is known beforehand that the beam passing through the upper half of the main lens 206 enters a pixel "R" of the image sensor 209 and the beam passing through the lower half of the main lens 206 enters a pixel "L" of the image sensor 209. According to the illustrated arrangement, it is feasible to obtain an image of the target object seen from a viewpoint set on the upper half of the main lens 206, by extracting only the pixels "R" and rearranging the extracted pixels. Similarly, it is feasible to obtain an image of the target image seen from a viewpoint set on the lower half of the main lens 206, by extracting only the pixels "L" and rearranging the extracted pixels. As described above, the plenoptic camera can obtain a plurality of images of the same object from a plurality of different viewpoints, by rearranging respective pixels of the obtained image.

Next, processing performed by the image processing apparatus 100 according to the present exemplary embodiment will be described in detail below. FIG. 3 is a block diagram illustrating the image processing apparatus 100. FIG. 4 is a flowchart illustrating a procedure of the processing performed by the image processing apparatus 100. The image processing apparatus 100 controls the constituent components illustrated in FIG. 1 as functional blocks illustrated in FIG. 3, when the CPU 101 executes the program loaded into the RAM 102 (i.e., the work area) from the ROM 103 to perform the processing illustrated in FIG. 4. Instead of causing the CPU 101 to perform the processing entirely, it is feasible to prepare a dedicated processing circuit that realizes a part or the whole of the functional blocks illustrated in FIG. 3 and causes the processing circuit to perform a part of the whole of the processing illustrated in FIG. 4. Hereinafter, the processing performed by the image processing apparatus 100 will be described in detail below with reference to FIGS. 3 and 4.

In step S401, an acquisition unit 301 acquires image data input from the imaging unit 110. The image data acquired in this case is multi-viewpoint image data obtained by a multi-eye camera (i.e., image data of the same object seen from a plurality of different viewpoints). The acquisition unit 301 outputs the acquired image data to a determining unit 302.

In step S402, the determining unit 302 acquires the image data input from the acquisition unit 301 and determines a standard image and a reference image to be used in disparity estimation. In the present exemplary embodiment, the standard image serves as a standard in disparity estimation. Block matching processing includes searching for a pixel of the reference image that corresponds to a pixel of interest of the standard image. The disparity map obtained from the disparity estimation is a disparity map corresponding to a viewpoint of the standard image. The determining unit 302 determines the standard image and the reference image from a plurality of images represented by the input image data and outputs the determined result to an estimation unit 303.

In step S403, the estimation unit 303 initializes a flag map. The flag map is binary image data indicating the pixel position where the disparity estimation should be performed. More specifically, the estimation unit 303 allocates a value "1" to a pixel position where the estimation unit 303 performs the disparity estimation and a value "0" to a pixel position where the estimation unit 303 does not perform the disparity estimation. In initial disparity estimation, the estimation unit 303 performs disparity estimation for all pixel positions. Therefore, the estimation unit 303 allocates a value "1" to all pixel positions of the flag map. The format of the flag map is not limited to the above-described example. Any other appropriate data format is usable as long as it indicates whether each pixel position is a processing target. Further, in the present exemplary embodiment, the flag map is stored in the RAM 102.

In step S404, the estimation unit 303 initializes a block size to be used the block matching processing. In the present exemplary embodiment, a smaller block size is selected at an initial stage of the block matching processing and subsequently the block size is gradually increased. In this step, the estimation unit 303 sets a smallest size determined beforehand as the block size to be used in the initial block matching processing. In the present exemplary embodiment, the block size to be used in the initial block matching processing is a square having each side equivalent to three pixels.

In step S405, the estimation unit 303 performs disparity estimation processing based on the flag map value and the set block size. The disparity estimation processing will be described in detail below. The estimation unit 303 outputs the disparity map generated through the estimation to a calculation unit 304.

In step S406, the calculation unit 304 calculates an evaluation value indicating the smoothness at each pixel position of the disparity map input from the estimation unit 303. The evaluation value obtained in this step is the magnitude of a variance of the disparity value in an image region including a processing target pixel in the disparity map input from the estimation unit 303. More specifically, when the variance of the disparity value is large, the smoothness is low. When the variance of the disparity value is small, the smoothness is high. The following formula defines the magnitude $V_d(x, y)$ of the variance of the disparity value.

[Math. 1]

$$V_d(x, y) = \frac{1}{|B|} \sum_{(x,y) \in B} l(x, y)^2 - \left( \frac{1}{|B|} \sum_{(x,y) \in B} l(x, y) \right)^2 \quad (1)$$

In the formula 1, l(x, y) represents a disparity value at a pixel position (x, y) of the disparity map and B represents an image region of the disparity map to be used in the calculation of the variance. In the present exemplary embodiment, the image region to be used in the variance calculation is a square region being equivalent to 5 pixels×5 pixels and including the processing target pixel positioned at the center thereof. The calculation unit 304 calculates the variance value Vd at each pixel position by inputting the disparity value indicated by the disparity map input from the estimation unit 303 into the formula (1). Then, the calculation unit 304 outputs the calculated variance value to a flag update unit 305.

In step S407, the flag update unit 305 updates the flag map stored in the RAM 102 based on the variance value input from the calculation unit 304. For a pixel whose variance value input from the calculation unit 304 is smaller than a predetermined threshold, the flag update unit 305 determines that a disparity of the pixel has been correctly estimated. Therefore, the flag update unit 305 updates the flag map value to 0. On the other hand, for a pixel whose variance value input from the calculation unit 304 is greater than the predetermined threshold value, the flag update unit 305 determines that a disparity of the pixel has not been correctly estimated. Therefore, the flag update unit 305 maintains the pixel value "1" in the flag map. In the present exemplary embodiment, the threshold value of the variance is 1 [pixel]. If the flag update unit 305 completes the flag map update processing, the flag update unit 305 outputs a signal indicating the completion of the flag map update processing to a determination unit 306. It is supposed that the RAM 102 currently stores the number of pixels to which the value "1" is allocated in the pre-update flag map, in addition to the latest version of the flag map.

In step S408, the determination unit 306 determines whether the flag map has converged with reference to the flag map updated in step S407. In the present exemplary embodiment, in determining whether the flag map has converged, the determination unit 306 compares the number of pixels to which the value "1." is allocated in the latest flag map with the number of pixels to which the value "1" is allocated in the pre-update flag map. The principle of flag map convergence determination will be described in detail below with reference to FIGS. 5A to 5D.

FIGS. 5A to 5D illustrate a relationship between the disparity map and the flag map in a k-th hierarchy. FIG. 5A illustrates a disparity map 501 updated based on the result of a k-th hierarchy disparity estimation, in which a brighter pixel indicates that the disparity is large (namely, the position is close to the imaging unit). FIG. 5A illustrates a region 502 in which the variance value exceeds the threshold value as an evaluation result of the disparity variance according to the formula (1) because the disparity value varies significantly. FIG. 5B illustrates a flag map 503 updated based on the disparity map 501. The flag map 503 includes a region 504 corresponding to the region 502, in which the value stored in each pixel is 1. In the flag map 503, the value stored in each pixel belonging to a region other than the region 504 is 0. Each pixel included in the region 504 is a target pixel to be subjected to the disparity estimation in a (k+1)th hierarchy. FIG. 5C illustrates a disparity map 505 updated based on disparity estimation result in the (k+1)th hierarchy. The disparity map 505 includes a region 506 in which the variance value exceeds the threshold value as an evaluation result of the disparity variance according to the formula (1). As a result of the disparity estimation in the (k+1)th hierarchy, it is understood that a region in which the disparity cannot be obtained appropriately has decreased. FIG. 5D illustrates a flag map 507 updated based on the disparity map 505. The flag map 507 includes a region 508 corresponding to the region 506 in which the value stored in each pixel is 1.

As described above, when the order of the hierarchy to be subjected to the disparity estimation increases, the region where the disparity cannot be obtained adequately, more specifically, the region where the variance value is large and therefore the value "1" is allocated in the flag map gradually decreases. Therefore, the determination unit 306 determines whether the flag map has converged based on the reduced number of pixels to which the value "1" is allocated in the flag map compared to that in the flag map corresponding to the previous hierarchy. More specifically, the determination unit 306 calculates a difference absolute value between the number of pixels to which the value "1" is allocated in the latest flag map and the number of pixels to which the value "1" is allocated in the flag map corresponding to the last-but-one hierarchy. Then, if the magnitude of the difference absolute value is equal to or less than a threshold value, the determination unit 306 determines that the flag map has converged. In the present exemplary embodiment, it is assumed that the RAM 102 stores the calculated number of pixels to which the value "1" is allocated in the latest flag map so that the stored value can be used in the determination in the next hierarchy. If the determination unit 306 determines that the flag map has converged (Yes in step S408), the determination unit 306 outputs the disparity map to a distance deriving unit 308. The operation proceeds to step S410. If the determination unit 306 determines that the flag map is not yet converged (No in step S408), the operation proceeds to step S409. Alternatively, if the number of iterations reaches a predetermined number, the determination unit 306 can immediately determine that the flag map has converged. According to such a configuration, it is feasible to prevent the processing load from exceeding a predetermined level although the accuracy of the disparity estimation may deteriorate relatively.

In step S409, a block size update unit 307 updates the block size to be used in the block matching processing. Then, the operation returns to step S404. In the present exemplary embodiment, it is assumed that the block to be used in the k-th iteration, i.e., the k-th hierarchy, is a square in shape and ($2^k$+1) in the length of each side. The size of the block in each hierarchy is not limited to the above-described example. For example, in a case where increasing the processing load is acceptable to perform highly accurate matching processing, the block to be used in the block matching processing can be set to be a square in shape and (2k+1) in the length of each side. It is desired that the number of hierarchies being set in this case is larger compared to the case where the used square is ($2^k$+1) in the length of each side. Further, the block to be used in the block matching processing is not limited to a square shape. Therefore, any other non-square shape, such as a rectangular shape or a circular shape, is employable in the block matching processing. Further, it is feasible to set a maximum block size in the initial disparity estimation and gradually reduce the block size according to the incrementing number of iterations. However, to reduce the possibility that a wrong disparity value is calculated in the far and near adjacent region, it is desired to initially set a smaller block size and gradually increase the block size according to the incrementing number of iterations as described in the present exemplary embodiment. Further, in the present exemplary embodiment, the block size update unit 307 changes the block size to be used in the matching processing according to the hierarchy, while fixing the image resolution. Alternatively, the block size update unit 307 can change the image resolution to be used in the matching processing according to the hierarchy while fixing the block size. More specifically, similar effects can be obtained if the object range corresponding to one block is set in such a way as to be differentiated in each hierarchy.

In step S410, the distance deriving unit 308 generates a distance map indicating an object distance corresponding to each pixel position based on the disparity map input from the determination unit 306 and the image-capturing parameters input from the imaging unit 110. The following formula defines a distance d(x, y)[m] corresponding to each pixel position.

[Math. 2]

$$d(x, y) = \frac{p_{pix} l(1 + \cos\alpha)}{2 l_{pix}(x, y) \sin\alpha} \quad (2)$$

In the formula (2), $\alpha$ represents the angle of view of the imaging unit 110, l represents an inter-viewpoint distance [m] between a reference viewpoint and a standard viewpoint, $l_{pix}$ represents a disparity value [pixel] corresponding to the pixel position (x, y), and $p_{pix}$ represents the total number of pixels constituting each image in a direction including disparity. The distance deriving unit 308 inputs values indicated by the image-capturing parameters of the imaging unit 110 and the disparity map into the formula (2). The distance deriving unit 308 outputs the obtained distance map, and then terminates the processing of the flowchart illustrated in FIG. 4.

The image processing apparatus 100 according to the present exemplary embodiment performs the processing according to the above-described procedure. Next, the processing to be performed by the estimation unit 303 (i.e., the processing in step S405) will be described in detail below. FIG. 6 is a flowchart illustrating details of the processing to be performed in step S405.

In step S601, the estimation unit 303 determines the pixel of interest in the standard image to be subjected to the disparity estimation, referring to the flag map stored in the RAM 102. In the disparity estimation of each hierarchy, the estimation unit 303 selects the pixel of interest from the pixels to which the value "1" is allocated in the flag map. In the present exemplary embodiment, the pixel of interest selected by the estimation unit 303 in an initial stage of the disparity estimation of each hierarchy is an upper leftmost pixel that is selected from the pixels to which the value "1" is allocated in the flag map. Subsequently, each time when the disparity corresponding to the pixel of interest is determined, the estimation unit 303 searches for a new pixel of interest that is not yet selected as the pixel of interest by searching for the pixels, to which the value "1" is allocated in the flag map, in a predetermined search direction advancing toward the lower right. The selection order of the pixel of interest is not limited to the above-described example. The pixel of interest may be determined according to any other appropriate order.

In step 602, the estimation unit 303 determines a reference pixel of the reference image to be compared with the pixel of interest. The estimation unit 303 selects the upper leftmost pixel of the reference image as an initial reference pixel. Subsequently, each time when an evaluation value of the reference pixel is calculated, the estimation unit 303 selects a new reference pixel that is not yet selected as the reference pixel along the search direction advancing toward the lower right. The selection order of the reference pixel is not limited to the above-described example. It is useful to exclude pixels belonging to a specific image region beforehand from reference pixel candidates if there is a higher possibility that the image region does not include any pixel corresponding to the pixel of interest. For example, in a case where the reference image corresponds to a viewpoint positioned on the right side of the standard image in the horizontal direction, a pixel corresponding to the same point of the object exists on the right side of the standard image in the horizontal direction in the reference image. Therefore, it is useful to designate each pixel of the reference image as a reference pixel candidate, if it exists on the right side of the pixel position of the pixel of interest in the horizontal direction. Further, in a case where a distance range in which an object exists is known beforehand, it is useful to exclude any pixel that is positioned far from the pixel of interest from the reference pixel candidates.

In step S603, the estimation unit 303 compares the pixel of interest with the reference pixel and calculates an evaluation value of the block matching processing. In the present exemplary embodiment, the evaluation value used by the estimation unit 303 is the magnitude of a variance of the pixel value between target blocks to be compared. It is assumed that each block to be used in the calculation of the variance is a square region that has a size indicated by the block size stored in the RAM 102 and includes the pixel of interest and the reference pixel at the center thereof. The estimation unit 303 calculates the variance of the pixel value between a block including the pixel of interest positioned at the center thereof and a block including the reference pixel positioned at the center thereof. Then, the estimation unit 303 detects an optimum combination that can minimize the variance as a pair of mutually corresponding blocks. Then, the estimation unit 303 derives a disparity corresponding to the pixel of interest based on a difference in pixel position between the pixel of interest and the reference pixel corresponding to the detected pair of blocks.

When $l_x$ represents a difference in the horizontal direction with respect to the pixel position between the pixel of interest and the reference pixel, and $l_y$ represents a difference in the vertical direction with respect to the pixel position between the pixel of interest and the reference pixel, the following formula defines an evaluation value $V_B(l_x, l_y, x, y)$ at the pixel position (x, y) of the pixel of interest. To simplify the description, it is assumed that optical axes of respective viewpoints are parallel to each other.

[Math. 3]

$$V_B(l_x, l_y, x, y) = \frac{1}{|B|} \sum_{(x,y) \in B} (I_b(x, y)^2 - I_r(x + l_x, y + l_y)^2) \quad (3)$$

In the formula (3), B represents an assembly of pixels included in the block to be used in the matching processing, and |B| indicates the number of pixels included in the region B. Further, $I_b(x, y)$ indicates a pixel value at the pixel position (x, y) of the standard image, and $I_r(x, y)$ indicates a pixel value at the pixel position (x, y) of the reference image. The estimation unit 303 stores the evaluation value derived using the formula 3 in the RAM 102. The evaluation value to be calculated in this case is not limited to the variance value of the pixel value defined by the formula 3. Any other evaluation value indicating the degree of similarity between two image regions is usable.

In step S604, the estimation unit 303 determines whether all pixels of the reference image have been referred to. If the estimation unit 303 determines that all pixels of the reference image have been referred to (Yes in step S604), the operation proceeds to step S605. If the estimation unit 303 determines that at least a part of the pixels of the reference image is not yet referred to (No in step S604), the operation returns to step S602 to designate a new pixel as the reference pixel.

In step S605, the estimation unit 303 compares all evaluation values calculated in step S603 and determines a disparity value corresponding to the pixel smallest in evaluation value as a disparity value of the pixel of interest. The data stored as the disparity value of the pixel of interest may be coordinate data ($l_x$, $l_y$) or the magnitude of a vector ($l_x$, $l_y$).

In step S606, the estimation unit 303 determines whether the disparity value has been determined for all pixels of the standard image. If the estimation unit 303 determines that the disparity value has been determined for all pixels (Yes in step S606), the operation proceeds to step S607. If the estimation unit 303 determines that the disparity value of at least one of the pixels is not yet determined (No in step S606), the operation returns to step S601 to designate a new pixel as the pixel of interest. In step S607, the estimation unit 303 generates a disparity map that stores a disparity value corresponding to each pixel of the standard image based on the disparity value determined in step S605. Then, the estimation unit 303 outputs the generated disparity map to the distance deriving unit 308 and terminates the processing of the flowchart illustrated in FIG. 6.

The image processing apparatus 100 according to the present exemplary embodiment performs the above-described processing. Through the above-described processing, the image processing apparatus 100 can highly accurately estimate a disparity between a plurality of images obtained by photographing the same object from a plurality of viewpoints that are mutually different. In the present exemplary embodiment, the acquisition unit 301 is functionally operable as an input unit configured to input image data representing a plurality of images of the same object seen from a plurality of viewpoints that are mutually different. Further, the estimation unit 303 is functionally operable as an estimation unit configured to estimate information indicating the magnitude of a disparity between the plurality of images by comparing the plurality of images with each other. Further, the calculation unit 304 is functionally operable as a deriving unit configured to derive an evaluation value indicating the degree of reliability of the information indicating the magnitude of the disparity estimated by the estimation unit. Further, the flag update unit 305 is functionally operable as a determination unit configured to determine whether the reliability indicated by the evaluation value derived by the deriving unit reaches a predetermined standard. More specifically, the calculation unit 304 and the flag update unit 305 are functionally operable as an identifying unit configured to identify, based on a disparity estimated by comparing image regions each having a first size, image regions for estimating a disparity by comparing image regions each having a second size.

Second Exemplary Embodiment

According to the first exemplary embodiment, the region to be used in the matching processing is a square image block including the pixel of interest and the reference pixel positioned at the center thereof. The present exemplary embodiment is characterized by changing the shape of a region to be used in the matching processing or changing the calculation region in obtaining smoothness of the disparity map for each pixel of interest, as described in detail below. FIG. 7 illustrates the concept of a matching region determination method according to the present exemplary embodiment. In FIG. 7, a square 701 is an image block composed of 5×5 pixels and includes the pixel of interest positioned at the center thereof, which is used in the block matching processing described in the first exemplary embodiment. In FIG. 7, a white pixel represents the pixel of interest. The square (i.e., the image block) 701 includes gray pixels each representing a region to be used in the matching processing and black pixels each representing a region excluded from the matching processing. As described above, the present exemplary embodiment is characterized by excluding inappropriate pixels from the image block to be subjected to the block matching processing and is capable of enhancing the accuracy of the matching processing.

The estimation unit 303 determines a pixel satisfying, for example, the following formula, as a pixel to be used in the matching processing, in which $(x_0, y_0)$ represents coordinates of the pixel of interest and $(x_k, y_k)$ represents coordinates of each pixel in the image block.

[Math.4]

$$|Y_b(x_k,y_k) - Y_b(x_0,y_0)| < \tau \qquad (4)$$

Further, $Y_b(x, y)$ represents luminance at the pixel position $(x, y)$ of the standard image and $\tau$ represents an appropriate threshold value. The formula (4) is based on the assumption that there is a higher possibility that a pixel, if it is similar to the pixel of interest in luminance, is similar to the pixel of interest in disparity value. More specifically, determining the matching region according to the formula (4) is useful to decrease a possibility of using information about an object that exists at a distance different from that of the pixel of interest in the matching processing, even in the far and near adjacent region. As a result, the accuracy of the disparity estimation can be improved. If it is desired to highly accurately obtain the disparity, a pixel whose (R, G, B) values satisfy the formula (4) may be designated as the matching region.

The above-described technique is also applicable when the calculation unit 304 calculates the smoothness of the disparity map. More specifically, in calculating the smoothness, the calculation unit 304 can use only the pixels having a luminance value and a pixel value that are closer to the luminance value and the pixel value of the pixel of interest so that an accurate smoothness can be obtained in the far and near adjacent region.

Third Exemplary Embodiment

The third exemplary embodiment is characterized by reducing the possibility that a wrong disparity value is calculated in a texture-less region, as described in detail below. The texture-less region may include a plurality of disparity value candidates that are not different so clearly in evaluation value. Therefore, there will be a higher possibility that a wrong disparity is selected in the texture-less region. Due to the characteristics described above, the disparity value varies greatly in the texture-less region on the calculated disparity map. However, a smooth region that indicates a wrong disparity may appear partly on the disparity map depending on the conditions of an object. In this case, the wrong disparity may be erroneously determined as a correct disparity. To prevent the occurrence of the above-described phenomenon, the estimation unit 303 according to the present exemplary embodiment performs the following processing.

The estimation unit 303 according to the present exemplary embodiment is characterized by taking into account a difference between the evaluation value of a first disparity candidate (i.e., the disparity of the image regions determined as being highest in the degree of matching) and the evaluation value of another disparity candidate into consideration. In a case where the number of disparity candidates whose difference from the first disparity candidate in evaluation value is equal to or less than a predetermined threshold value is equal to or greater than a predetermined number, the degree of reliability of the first disparity candidate is low. Therefore, the estimation unit 303 changes the disparity candidate to be selected in such a way as to prevent the first disparity candidate from being selected as a disparity in a region greater than a predetermined size. For example, instead of determining the first disparity candidate as a disparity corresponding to the pixel, the estimation unit 303 determines a disparity candidate randomly selected from among a plurality of disparity candidates, whose evaluation values are equal to or less than a predetermined threshold, as the disparity corresponding to the pixel. The above-described processing is equivalent to selecting one of the pairs compared in the block matching processing. Thus, it becomes feasible to prevent a smooth region indicating a wrong disparity from appearing on the disparity map and prevent the wrong disparity from being erroneously determined as a correct disparity. In a case where the above-described processing is performed on the texture-less region, the smoothness of the disparity map becomes lower. Therefore, the estimation unit 303 changes the block size to be used in the matching processing and perform the disparity estimation processing again. In other words, there will be a higher possibility that an appropriate block size can be set in the disparity estimation processing.

Randomly selecting a disparity from among a plurality of disparity candidate is not an essentially required process. Any other appropriate selection method is employable as long as it can prevent the deviation in the selection of disparity candidates.

Fourth Exemplary Embodiment

The processing described in the first to third exemplary embodiments includes performing the block matching processing on images that are obtained by photographing the same object from a plurality of viewpoints that are different from each other, to obtain a disparity between respective images. The present exemplary embodiment is characterized by using light field data generated based on multi-viewpoint image data to obtain a disparity between respective images through processing in a light field space (hereinafter, the light field is referred to as "LF"), as described in detail below.

First, a definition of LF data and an LF space will be described in detail below. The LF data indicates information about incident position, incident direction, and intensity of a beam entering the camera from an object. In general, the LF data is represented by space coordinates (x, y) indicating an incident point of a beam on the imaging plane, direction coordinates (u, v) or $(\theta, \varphi)$ indicating a beam direction, and L that represents the intensity of the beam. The coordinates (u, v) indicate a point where the beam passes through a uv plane that is parallel to an xy plane with a predetermined distance therebetween. The coordinates $(\theta, \varphi)$ indicate the angle of the beam entering through the point (x, y). The expression of the LF data is not limited to the above-described example. Any expression format is usable as long as it includes parameters capable of defining the incident position, the incident direction, and the intensity of a beam. For example, instead of using the expression of the intensity at a point in the above-described four-dimensional space, it is feasible to employ a generalized expression using a seven-dimensional space. Data in the seven-dimensional space is generally referred to as plenoptic function, which includes three-dimensional space coordinates, two-dimensional direction coordinates, time, and wavelength.

The LF data used in the present exemplary embodiment is a four-dimensional data that can be expressed by L(x, y, u, v), To simplify the following description, a two-dimensional cross section of LF data is expressed by using a one-dimensional space coordinate and a one-dimensional direction coordinate. In general, the above-described cross section of the LF data may be referred to as an epipolar-plane image, although it is referred to as "two-dimensional LF data" in the following description. Characteristics of two-dimensional LF data and related processing thereof described below can be directly applied to four-dimensional LF data. Further, in a case where the above-described format is not used to express LF data, multi-viewpoint image data acquired, for example, by a multi-eye camera or a plenoptic camera is usable to generate the LF data. In the above description, (x, y) represents the pixel position in each image and (u, v) represents a viewpoint corresponding to each image. Therefore, the conversion into the four-dimensional LF data L(x, y, u, v) is feasible when allocating coordinates to the pixel value of each pixel in a disparity image group is based on the above-described correspondence relationship.

FIG. 8 illustrates an example of the LF data in the two-dimensional LF space, in which the horizontal axis represents the space coordinate x and the vertical axis represents the direction coordinate u. The light and shade of each data indicates the intensity value L. As illustrated in FIG. 8, a data point corresponding to the same point on the object forms a line segment in the LF space defined by the space coordinate and the direction coordinate of a beam, because beams emitted from the same point on the object have the same correlation between the space coordinate and the direction coordinate. The gradient of the line segment indicates the difference in incident position on the sensor when beams enter from different viewpoints, more specifically, the magnitude of a disparity between a plurality of images seen from different viewpoints. Therefore, in the present exemplary embodiment, the image processing apparatus 100 obtains a disparity by checking the gradient of a line segment indicated by LF data in the LF space, as described in detail below.

First, the principle of a method for checking the gradient of a line segment represented by LF data according to the present exemplary embodiment will be described in detail below. The method according to the present exemplary embodiment includes evaluating the variance of pixel values of pixels on a straight line passing through the pixel of interest while changing the gradient of the straight line and outputting a gradient corresponding to a straight line that is smallest in the variance of the pixel value as a disparity. However, in a region where straight lines each having the same gradient exist in a wide range, such as a texture-less region, there will be a higher posibility that variance values calculated for respective gradients are substantially the same. Therefore, the accuracy of the disparity estimation will deteriorate. In view of the foregoing, the straight line used in the present exemplary embodiment to evaluate the variance is set as a linear zone having a significant width. This is effective in acquiring an accurate gradient even in the texture-less region, because evaluating the variance is performed based on pixel values of pixels that exist in the linear zone. The method according to the present exemplary embodiment includes switching the width of the linear zone to be used for each hierarchy, because it is useful to use a linear zone having a smaller width in a far and near adjacent region to obtain the variance. On the other hand, it is useful to use a linear zone having a large width in a texture-less region so that highly accurate disparity estimation can be realized. FIG. 9 illustrates the above-described principle.

In FIG. 9, data 901 is LF data in the LF space. Further, a region 902 is a linear zone to be used in the calculation of the variance. A width 903 indicates the width of the linear zone 902 to be used in the calculation of the variance. The data 901 includes a far and near adjacent region 904 and a texture-less region 905. As illustrated in FIG. 9, if the width of the linear zone 903 to be used in the calculation of the variance is increased in the far and near adjacent region 904, there will be a higher possibility that a plurality of straight lines mutually different in gradient are included in the region. In other words, the accuracy of gradient calculation will deteriorate. On the other hand, if a thin linear zone is used to calculate the variance in the texture-less region, there will be a higher possibility that the variance is not so different between two or more gradients in the vicinity of a correct gradient. Therefore, the correct gradient cannot be uniquely determined. Accordingly, the accuracy of the disparity estimation processing will decrease. From the above reasons, the image processing apparatus 100 uses a thin linear zone in the far and near adjacent region and uses a thick linear zone in the texture-less region to obtain the variance so that highly accurate disparity estimation processing can be performed.

Hereinafter, processing performed by the image processing apparatus 100 according to the present exemplary embodiment will be described in detail below. Redundant description of processing similar to that already described in the first exemplary embodiment or in the second exemplary embodiment will be avoided. FIG. 10 is a block diagram illustrating the image processing apparatus 100 according to the present exemplary embodiment. FIG. 11 is a flowchart illustrating a procedure of the processing that is performed by the image processing apparatus 100. The image processing apparatus 100 includes the CPU 101 that can execute the program loaded into the RAM 102 (i.e., the work area) from the ROM 103 to control the constituent components illustrated in FIG. 1 as functional blocks illustrated in FIG. 10 and realize the processing illustrated in FIG. 11.

Hereinafter, characteristic features not described in the first exemplary embodiment or the second exemplary embodiment will be described in detail below with reference to FIGS. 10 and 11. In step S1101, the conversion unit 1001 converts the image data received from the acquisition unit 301 into LF data. In the present exemplary embodiment, the LF data is four-dimensional LF data L(x, y, u, v). However, the LF data used in the following description to simplify the description of processing principle is two-dimensional LF data. In the conversion of the LF data, it is assumed that a pixel of interest position in each image represented by image data is input to (x, y), a pixel value at the pixel of interest position is input to L, and a coordinate position representing a viewpoint corresponding to each pixel is input to (u, v). The conversion unit 1001 outputs the LF data generated through the conversion processing to an estimation unit 1002. Then, the operation proceeds to step S403. In the present exemplary embodiment, the processing performed in this step is converting multi-viewpoint image data into LF data. Alternatively, instead of using the converted LF data, it is feasible to read LF data preliminarily stored in the secondary storage device 104 and input the readout LF data to the estimation unit 1002.

In step S1102, the estimation unit 303 initializes the width of a straight line to be used in disparity value estimation. In the present exemplary embodiment, the estimation unit 303 selects a thin straight line in an initial stage of the variance value calculation and gradually increases the width of the straight line. Therefore, in this step, the estimation unit 303 sets the width of a straight line to be used in the calculation of the variance value to a smallest value having been set beforehand. In the present exemplary embodiment, the estimation unit 303 sets the width of an initially used straight line to one pixel.

In step S1103, the estimation unit 1002 performs disparity estimation processing based on the gradient of a line segment indicated by the LF data. The processing performed in this step will be described in detail below.

In step S1104, the size update unit 1003 updates the width of the straight line to be used in the disparity value estimation. Then, the operation returns to step S1103. In the present exemplary embodiment, the size update unit 1003 sets the $(2^k+1)$ pixel as the width of the straight line to be used in the k-th iteration (i.e., the k-th hierarchy). Alternatively, if it is desired to increase the accuracy in the matching processing even though the processing load increases significantly, the size update unit 1003 can set the (2k+1) pixel as the width of the straight line to be used in the k-th hierarchy. It is desired that the number of hierarchies being set in this case is larger compared to the case where the $(2^k+1)$ pixel is used as the width of the straight line.

The image processing apparatus 100 according to the present exemplary embodiment performs the processing according to the above procedure. Next, the processing to be performed by the estimation unit 1002 according to the present exemplary embodiment (i.e., the processing in step S1103) will be described in detail below with reference to FIG. 12. Some of the processing to be performed in step S1103 is similar to the processing performed in step S405 illustrated in FIG. 4 and therefore redundant description thereof will be avoided.

In step S1201, the estimation unit 1002 determines the pixel of interest. The pixel of interest determined in this step is a pixel on the xy plane at the coordinate position (u, v) determined beforehand, which indicates a pixel of an image captured from a viewpoint corresponding to the determined coordinate position (u, v). If the LF data is two-dimensional data, the estimation unit 1002 determines the coordinate x at the determined coordinate u. In this case, it is desired to select a viewpoint closer to the center to determine the pixel of interest if there are many viewpoints selectable. For example, in a case where input multi-viewpoint image data indicates images corresponding to five viewpoints (u=1, 2, 3, 4, and 5) arrayed at regular intervals, it is desired to use the xy plane corresponding to u=3. If an edge viewpoint (e.g., u=1 or u=5) is selected to determine the pixel of interest, there will be a pixel that cannot obtain a disparity at an edge portion of the LF data. A method for determining the pixel of interest on the determined xy plane is similar to the method described in step S601 and therefore redundant description thereof will be avoided.

In step S1202, the estimation unit 1002 determines the gradient of a linear zone to be used in the calculation of the variance. If the coordinate u of the xy plane on which the pixel of interest is present is set to u=0 and the x coordinate of the pixel of interest is set to x=xn, a straight line passing through the pixel of interest can be expressed by the formula $x=x_0+\alpha u$. This means that a disparity applied at a viewpoint whose position is deviated by u on the straight line is $\alpha u$. In the present exemplary embodiment, the estimation unit 1002 changes the value $\alpha$ as the gradient of the straight line and stores the value $\alpha$ corresponding to each pixel of interest in the disparity map as a value indicating the disparity corresponding to the pixel of interest. In this step, the estimation unit 1002 selects a gradient candidate to be used in the calculation of the variance from a plurality of gradient candidates stored beforehand in the RAM 102. For example, in the present exemplary embodiment, there are 256 gradient candidates set beforehand in such a way that the angular difference between straight lines indicated by respective gradients becomes equal distance, ranging from a gradient corresponding to a closest object whose inter-image disparity is detectable to a gradient corresponding to an infinite object. If the estimation unit 1002 selects one gradient candidate, the operation proceeds to step S1203. If the operation returns to this step after completing the processing in the following step, the estimation unit 1002 newly selects one of the gradient candidates that are not yet selected.

In step S1203, the estimation unit 1002 calculates an evaluation value of the gradient determined in step S1202. The evaluation value calculated in this case is a variance of the intensity value L(u, x) of the LF data included in the linear zone. The following formula defines an evaluation value V($\alpha$, x) of a linear zone having the gradient $\alpha$ at the pixel of interest position x.

[Math. 5]

$$V(\alpha, x) = \frac{1}{\Delta \cdot \Delta u} \int_0^{\Delta u} du \int_{-\frac{\Delta}{2}}^{\frac{\Delta}{2}} dt L(u, x + t + \alpha u)^2 - \left(\frac{1}{\Delta \cdot \Delta u} \int_0^{\Delta u} du \int_{-\frac{\Delta}{2}}^{\frac{\Delta}{2}} dt L(u, x + t + \alpha u)\right)^2 \quad (5)$$

In the formula (5), $\Delta u$ represents the width of the two-dimensional LF data in the u-axis direction, and $\Delta$ represents the width of a linear zone to be used in calculating the evaluation value in the x-axis direction. The estimation unit 1002 stores the evaluation value obtained by inputting each parameter into the formula 4 in the RAM 102. The operation proceeds to step S1204.

In step S1204, the estimation unit 1002 determines whether the evaluation value is calculated for all of the gradient candidates. If the estimation unit 1002 determines that the evaluation value is calculated for all of the gradient candidates (Yes in step S1204), the operation proceeds to step S1205. If the estimation unit 1002 determines that there is at least one gradient candidate for which the evaluation value is not yet calculated (No in step S1204), the operation returns to step S1202. The estimation unit 1002 selects a new gradient candidate.

In step S1205, the estimation unit 1002 compares the evaluation values calculated for all gradient candidates stored in the RAM 102 and determines a gradient $\alpha$ that is smallest in evaluation value as a value at the pixel of interest in the disparity map. Processing performed in steps S606 and S607 is similar to that described in the first exemplary embodiment and therefore redundant description thereof will be avoided. With the above processing, the disparity estimation can be performed highly accurately.

Other Exemplary Embodiments

The present invention is not limited to the above-described exemplary embodiments and can be embodied in various ways. For example, the image processing apparatus can use three or more images to perform disparity value estimation, although the image processing apparatus according to the first exemplary embodiment estimates the disparity value by comparing the standard image and the reference image selected from a plurality of images represented by multi-viewpoint image data. A disparity value stored in this case is the movement amount of the object image obtained for each unit vector representing the positional relationship between respective viewpoints. In this case, the evaluation value to be used in the matching processing can be defined by the following formula.

[Math. 6]

$$V(l, x, y) = \frac{1}{|B|} \sum_{(x,y)\in B} \left( \left( \frac{1}{n} \sum_{k=1}^{n} I_k(x + lr_{xk}, y + lr_{yk})^2 \right) - \left( \frac{1}{n} \sum_{k=1}^{n} I_k(x + lr_{xk}, y + lr_{yk}) \right)^2 \right) \quad (6)$$

In the formula (6), B represents an assembly of pixels included in a block to be used in the matching processing, and |B| indicates the number of pixels included in the region B. Further, l represents a disparity value indicating the movement amount of an object image obtained for each unit vector described above and $(r_{xk}, r_{yk})$ represents a relative position vector of each viewpoint seen from the standard viewpoint, and n indicates the total number of viewpoints to be used in the matching processing.

Further, in the above-described exemplary embodiment, the image processing apparatus performs the disparity estimation according to the block matching method. Alternatively, any other appropriate method is employable to perform the disparity estimation. For example, an employable method may include extracting a block having a size corresponding to each hierarchy from the standard image, deriving an image region corresponding to the clipped block from the entire reference image according to a phase only correlation method, and estimating a disparity based on the position of the derived corresponding image region.

Further, in the above-described exemplary embodiment, the image processing apparatus updates the flag map based on the smoothness of the disparity map and generates the distance map by using the disparity map generated through the processing performed until the flag map converges. However, the order of the distance map generation processing is not limited to the above-described example. For example, the processing may include deriving the distance map for each hierarchy and updating the flag map based on the smoothness of the distance map in each hierarchy. A disparity between respective viewpoints indicated by multi-viewpoint image data is dependent on the distance of an object. Therefore, the distance map storing the distance of the object corresponding to each pixel position may be referred to as information indicating the magnitude of the disparity.

The present invention can be realized by the following processing. More specifically, the processing includes supplying a program capable of realizing at least one of the functions described in the above-described exemplary embodiments to a system or an apparatus via a network or an appropriate storage medium and causing at least one processor of a computer provided in the system or the apparatus to read and execute the program. Further, the present invention can be realized by a circuit (e.g., application specific integrated circuit (ASIC)) capable of realizing at least one of the above-described functions.

The present invention can improve the accuracy in disparity estimation between a plurality of images obtained by photographing the same object from a plurality of viewpoints that are mutually different.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD) (registered trademark), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-208405, filed Oct. 9, 2014, which is hereby incorporated by reference herein in its entirety.

The invention claimed is:

1. An image processing apparatus comprising:
   one or more processors; and
   one or more memories storing instructions, when executed by the one or more processors, causing the image processing apparatus to function as:
   an input unit configured to input image data representing a plurality of images obtained by photographing the same object from a plurality of viewpoints that are mutually different;
   an estimation unit configured to estimate first information indicating a disparity map comprising a magnitude of a disparity between the plurality of images by comparing image regions each having a first size between the plurality of images;

a deriving unit configured to derive an evaluation value indicating a degree of reliability for each pixel position of the disparity map;

a determination unit configured to determine whether the degree of reliability reaches a predetermined standard; and an identifying unit configured to identify image regions of the plurality of images whose degree of reliability has not reached the predetermined standard as image regions to be subjected to disparity estimation by comparing image regions each having a second size, which is different from the first size, between the plurality of images, based on the derived evaluation value, wherein the estimation unit further estimates second information indicating a magnitude of a disparity between the plurality of images in the image regions identified by the identifying unit by comparing the image regions each having the second size between the plurality of images.

2. The image processing apparatus according to claim 1, wherein the deriving unit derives a variance of the disparity value in an image region including the pixel in the disparity map as the evaluation value indicating the degree of reliability of the disparity value stored at each pixel position of the first disparity map, and the determination unit determines that the degree of reliability of the disparity value stored at the pixel does not reach the predetermined standard, when the variance derived by the deriving unit exceeds a predetermined threshold value.

3. The image processing apparatus according to claim 1, wherein the first size is smaller than the second size.

4. The image processing apparatus according to claim 1, wherein information indicating the magnitude of the disparity is information indicating a distance to the object.

5. The image processing apparatus according to claim 1, wherein the estimation unit estimates information indicating the magnitude of the disparity by performing block matching processing on the plurality of images.

6. The image processing apparatus according to claim 5, further comprising:

an exclusion unit configured to exclude each pixel included in a block to be used in the block matching processing from pixels to be used in the block matching processing if the pixel does not satisfy a predetermined standard with respect to the degree of similarity to a pixel of interest serving as a standard in the block matching processing.

7. The image processing apparatus according to claim 6, wherein the exclusion unit is configured to exclude each pixel from the pixels to be used in the block matching processing if a difference between the pixel and the pixel of interest exceeds a predetermined threshold value with respect to luminance value.

8. The image processing apparatus according to claim 6, wherein the exclusion unit excludes each pixel from the pixels to be used in the block matching processing if a difference between the pixel and the pixel of interest exceeds a predetermined threshold value with respect to pixel value.

9. The image processing apparatus according to claim 5, wherein if the number of block pairs that are equal to or less than a predetermined threshold value with respect to difference in evaluation value from a block pair highest in the evaluation value indicating the degree of similarity between a pair of compared blocks in the block matching processing is equal to or greater than a predetermined number, the estimation unit is configured to select one of the plurality of block pairs that is equal to or less than a predetermined threshold value with respect to difference in evaluation value and estimate information indicating the magnitude of the disparity based on the selected block pair.

10. An image processing apparatus, comprising:

one or more processors; and one or more memories storing instructions, when executed by the one or more processors, causing the image processing apparatus to function as:

an input unit configured to input image data representing a plurality of images each having a first resolution, which is obtained by photographing the same object from a plurality of viewpoints that are mutually different;

an estimation unit configured to estimate first information indicating a disparity map comprising a magnitude of a disparity between the plurality of images by comparing the plurality of images with each other;

a deriving unit configured to derive an evaluation value indicating a degree of reliability for each pixel position of the disparity map;

a determination unit configured to determine whether the degree of reliability reaches a predetermined standard;

a conversion unit configured to convert the resolution of the plurality of images into a second resolution that is different from the first resolution; and an identifying unit configured to identify image regions of the plurality of images whose degree of reliability has not reached the predetermined standard as image regions to be subjected to disparity estimation by comparing the images each having the second resolution converted by the conversion unit, based on the derived evaluation value;

wherein the estimation unit further estimates second information indicating the magnitude of a disparity between the plurality of images in the image regions identified by the identifying unit by comparing the images each having the second resolution converted by the conversion unit.

11. The image processing apparatus according to claim 10, wherein the second resolution is lower than the first resolution.

12. An image processing apparatus, comprising:

one or more processors; and one or more memories storing instructions, when executed by the one or more processors, causing the image processing apparatus to function as:

an input unit configured to input light field data, which is data representing a plurality of images that is obtained by photographing the same object from a plurality of viewpoints that are mutually different, and is data indicating incident position, incident direction, and intensity of a beam entering an imaging apparatus from the object;

an estimation unit configured to estimate first information indicating a disparity map comprising a magnitude of a disparity between the plurality of images by matching a line segment indicated by the light field data with a plurality of straight lines having first thickness and differentiated in gradient, in a light field space defined by the incident position and the incident direction of the beam entering the imaging apparatus from the object;

a deriving unit configured to derive an evaluation value indicating a degree of reliability for each pixel position of the disparity map;

a determination unit configured to determine whether the degree of reliability reaches a predetermined standard; and an identifying unit configured to identify image regions of the plurality of images whose degree of reliability has not reached the predetermined standard as image regions to be subjected to disparity estimation by matching the line segment indicated by the light field data with straight lines having a second thickness, which is different from the first thickness, in the light field space, based on the derived evaluation value;

wherein the estimation unit further estimates second information indicating a magnitude of a disparity between the plurality of images in the image regions identified by the identifying unit by matching the line segment indicated by the light field data with the straight lines having the second thickness in the light field space.

13. The image processing apparatus according to claim 12, wherein the first thickness is smaller than the second thickness.

14. A non-transitory computer-readable storage medium storing instructions that, when executed by a computer, causes the computer to perform a method comprising:
inputting image data representing a plurality of images that is obtained by photographing the same object from a plurality of viewpoints that are mutually different;
first estimating first information indicating a disparity map comprising the magnitude of a disparity between the plurality of images by comparing image regions each having a first size between the plurality of images;
deriving an evaluation value indicating a degree of reliability for each pixel position of the disparity map;
determining whether the degree of reliability reaches a predetermined standard;
identifying image regions of the plurality of images whose degree of reliability has not reached the predetermined standard as image regions to be subjected to disparity estimation by comparing image regions each having a second size, which is different from the first size, between the plurality of images, based on the derived evaluation value; and
second estimating second information indicating the magnitude of a disparity between the plurality of images in the image regions identified in the identifying by comparing the image regions each having the second size between the plurality of images.

15. An image processing method comprising:
inputting image data representing a plurality of images that is obtained by photographing the same object from a plurality of viewpoints that are mutually different;
first estimating first information indicating a disparity map comprising the magnitude of a disparity between the plurality of images by comparing image regions each having a first size between the plurality of images;
deriving an evaluation value indicating a degree of reliability for each pixel position of the disparity map;
determining whether the degree of reliability reaches a predetermined standard;
identifying image regions of the plurality of images whose degree of reliability has not reached the predetermined standard as image regions to be subjected to disparity estimation by comparing image regions each having a second size, which is different from the first size, between the plurality of images, based on the derived evaluation value; and
second estimating second information indicating the magnitude of a disparity between the plurality of images in the image regions identified in the identifying by comparing the image regions each having the second size between the plurality of images.

16. An image processing method, comprising:
inputting image data representing a plurality of images each having a first resolution, which is obtained by photographing the same object from a plurality of viewpoints that are mutually different;
first estimating first information indicating a disparity map comprising a magnitude of a disparity between the plurality of images by comparing the plurality of images with each other;
converting the resolution of the plurality of images into a second resolution that is different from the first resolution;
deriving an evaluation value indicating a degree of reliability for each pixel position of the disparity map;
determining whether the degree of reliability reaches a predetermined standard;
identifying image regions of the plurality of images whose degree of reliability has not reached the predetermined standard as image regions to be subjected to disparity estimation by comparing the images each having the second resolution converted in the converting, based on the derived evaluation value; and
second estimating second information indicating a magnitude of a disparity between the plurality of images in the image regions identified in the identifying by comparing the images each having the second resolution converted in the converting.

17. An image processing method, comprising:
inputting light field data, which is data representing a plurality of images that is obtained by photographing the same object from a plurality of viewpoints that are mutually different, and is data indicating incident position, incident direction, and intensity of a beam entering an imaging apparatus from the object;
estimating first information indicating a disparity map comprising the magnitude of a disparity between the plurality of images by matching a line segment indicated by the light field data with a plurality of straight lines having first thickness and differentiated in gradient, in a light field space defined by the incident position and the incident direction of the beam entering the imaging apparatus from the object;
deriving an evaluation value indicating a degree of reliability for each pixel position of the disparity map;
determining whether the degree of reliability reaches a predetermined standard;
identifying image regions of the plurality of images whose degree of reliability has not reached the predetermined standard as image regions to be subjected to disparity estimation by matching the line segment indicated by the light field data with straight lines having a second thickness, which is different from the first thickness, in the light field space, based on the derived evaluation value; and
second estimating second estimation indicating a magnitude of a disparity between the plurality of images in the image regions identified in the identifying by matching the line segment indicated by the light field data with the straight lines having the second thickness in the light field space.

* * * * *